(12) United States Patent
Raffaelli

(10) Patent No.: US 10,828,956 B2
(45) Date of Patent: Nov. 10, 2020

(54) FORECARRIAGE OF A ROLLING MOTOR VEHICLE

(71) Applicant: PIAGGIO & C. S.p.A., Pisa (IT)

(72) Inventor: Andrea Raffaelli, Pisa (IT)

(73) Assignee: PIAGGIO & C. S.p.A., Pisa (IT)

(*) Notice: Subject to any disclaimer, the term of this patent is extended or adjusted under 35 U.S.C. 154(b) by 169 days.

(21) Appl. No.: 16/065,987

(22) PCT Filed: Dec. 28, 2016

(86) PCT No.: PCT/IB2016/058048
§ 371 (c)(1),
(2) Date: Jun. 25, 2018

(87) PCT Pub. No.: WO2017/115297
PCT Pub. Date: Jul. 6, 2017

(65) Prior Publication Data
US 2019/0009633 A1  Jan. 10, 2019

(30) Foreign Application Priority Data

Dec. 28, 2015  (IT) .................. 102015000088087

(51) Int. Cl.
*B62K 5/01* (2013.01)
*B62K 5/027* (2013.01)
(Continued)

(52) U.S. Cl.
CPC .............. *B60G 21/05* (2013.01); *B62D 9/02* (2013.01); *B62K 5/01* (2013.01); *B62K 5/027* (2013.01);
(Continued)

(58) Field of Classification Search
CPC .......... B62K 25/08; B62K 5/01; B62K 5/027; B62K 5/10; B62K 5/001; B62D 9/02
See application file for complete search history.

(56) References Cited

U.S. PATENT DOCUMENTS 2,029,735 A * 2/1936 Minett .................. B62D 9/02
                                                                280/124.109
9,216,790 B2 * 12/2015 Takano ............... B60G 17/005
(Continued)

FOREIGN PATENT DOCUMENTS

EP    2345576 A1    7/2011
EP    2810861 A1    12/2014
(Continued)

OTHER PUBLICATIONS

International Search Report PCT/IB2016/058048 dated Apr. 18, 2017.

*Primary Examiner* — Faye M Fleming
(74) *Attorney, Agent, or Firm* — Arent Fox LLP; Michael Fainberg

(57) ABSTRACT

The present invention relates to a forecarriage of a rolling motor vehicle with three or four wheels, comprising: —a forecarriage frame; at least one pair of front wheels kinematically connected to each other and to the forecarriage frame by means of a first kinematic mechanism which enables the front wheels to roll in a synchronous and specular manner, each wheel being connected to the first kinematic mechanism by means of a respective axle journal the latter being mechanically connected to a rotation pin of the wheel in order to support it rotatably around an axis of rotation, —a roll block system; —suspension means which guarantee each axle journal at least one spring suspension movement with respect to said first kinematic mechanism.

36 Claims, 17 Drawing Sheets

(51) Int. Cl.
  *B62K 5/10* (2013.01)
  *B60G 21/05* (2006.01)
  *B62D 9/02* (2006.01)
  *B62K 5/08* (2006.01)
  *B62K 5/00* (2013.01)

(52) U.S. Cl.
  CPC .................. *B62K 5/08* (2013.01); *B62K 5/10* (2013.01); *B60G 2300/122* (2013.01); *B60G 2300/45* (2013.01); *B62K 2005/001* (2013.01)

(56) References Cited

U.S. PATENT DOCUMENTS

| | | | |
|---|---|---|---|
| 9,238,494 B2 * | 1/2016 | Iizuka | B62K 5/027 |
| 2013/0131923 A1 * | 5/2013 | Tzipman | B62D 24/04 |
| | | | 701/38 |
| 2018/0265157 A1 * | 9/2018 | Hara | B62K 25/08 |
| 2019/0009630 A1 * | 1/2019 | Raffaelli | B62K 5/08 |
| 2019/0344855 A1 * | 11/2019 | Raffaelli | B62K 5/10 |
| 2019/0366792 A1 * | 12/2019 | Raffaelli | B60G 21/05 |

FOREIGN PATENT DOCUMENTS

| | | |
|---|---|---|
| EP | 2889210 A1 | 7/2015 |
| EP | 2899107 A1 | 7/2015 |
| EP | 2913255 A1 | 9/2015 |
| FR | 2953184 A1 | 6/2011 |

\* cited by examiner

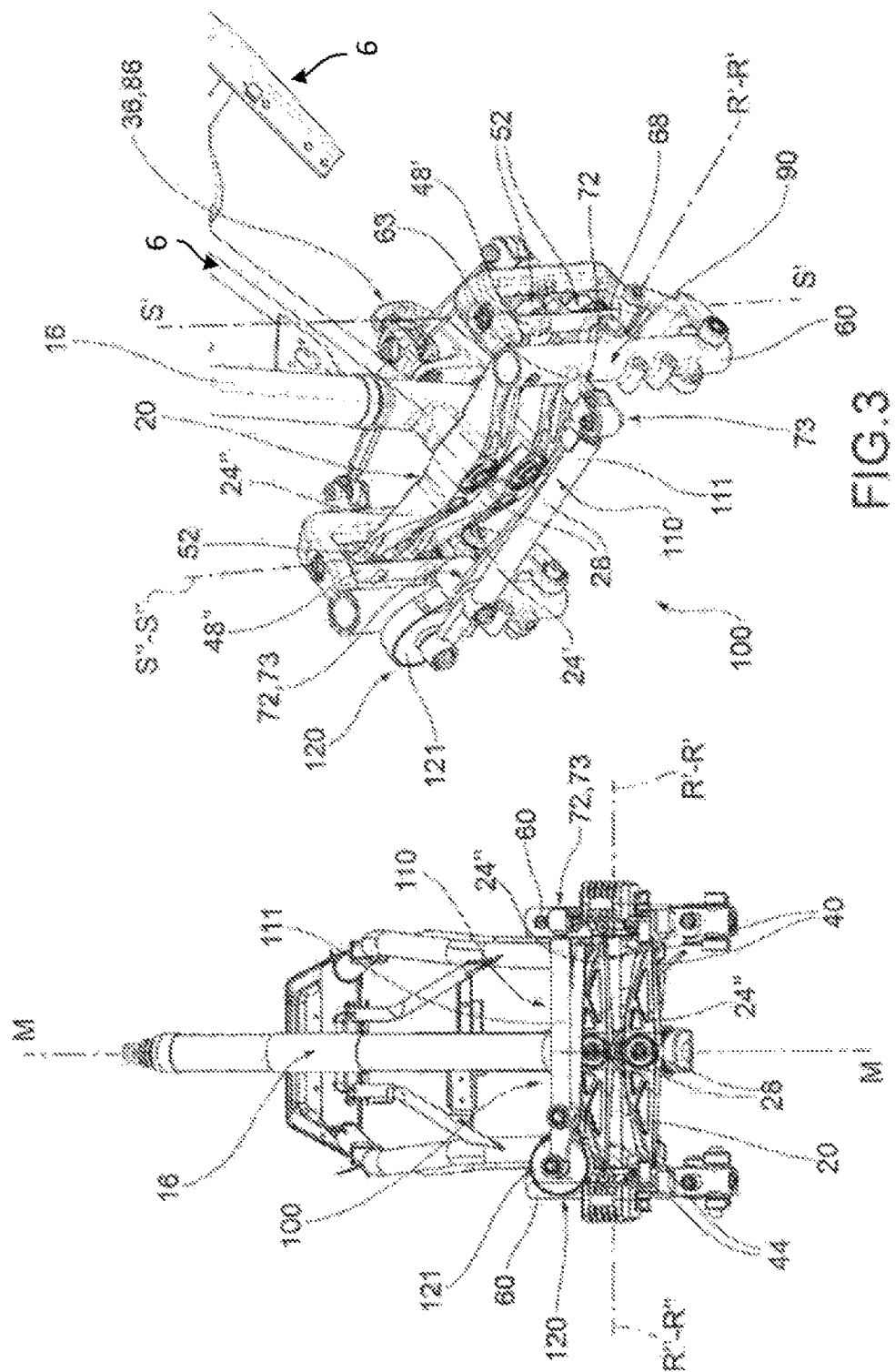

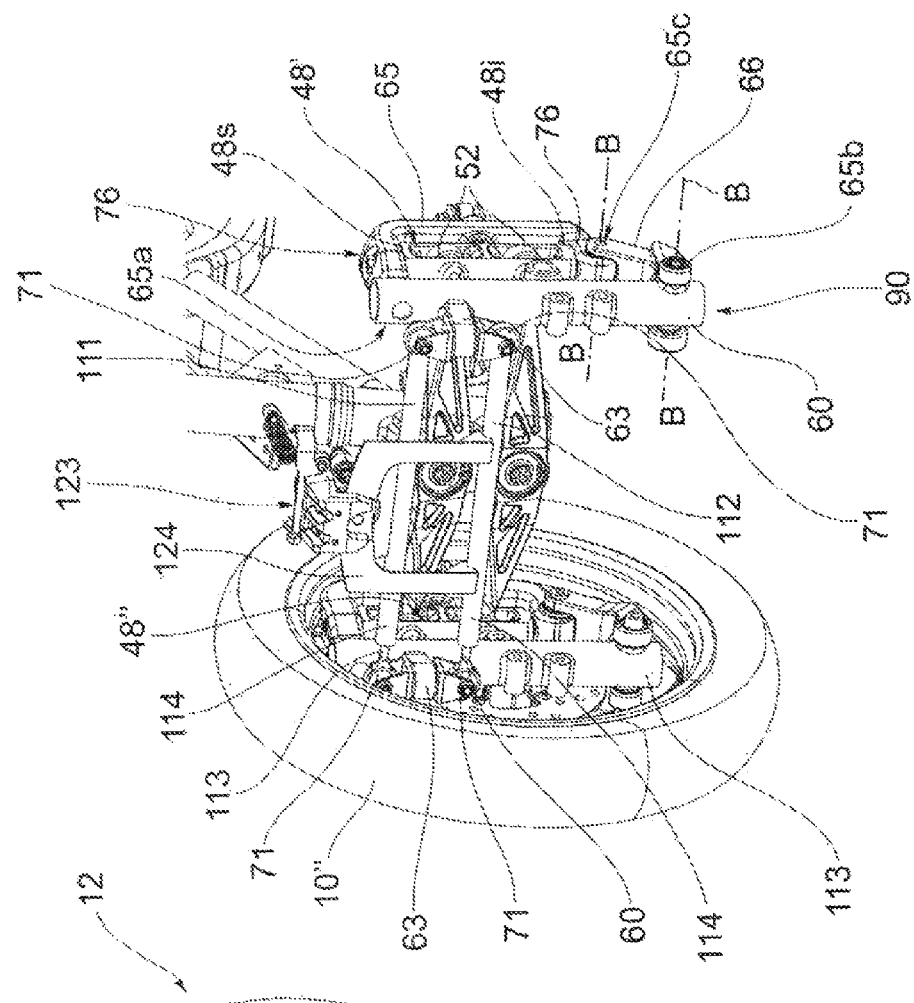
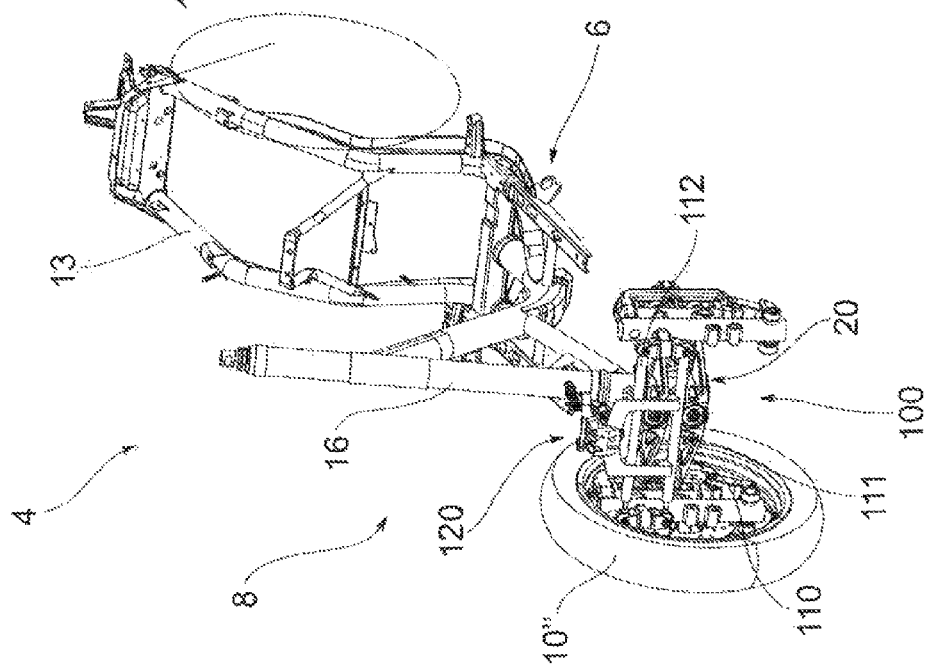
FIG. 11
FIG. 10

FORECARRIAGE OF A ROLLING MOTOR VEHICLE

CROSS-REFERENCE TO RELATED APPLICATIONS

This application is the U.S. National Stage Application of International Patent Application No. PCT/IB2016/058048, filed on Dec. 28, 2016, which claims priority to Italian Patent Application No. 102015000088087, filed on Dec. 28, 2015, the contents of each of which is incorporated herein by reference in its entirety.

FIELD OF APPLICATION

The present invention relates to a forecarriage of a rolling motor vehicle with roll block.

In particular, the motor vehicle according to the invention may be a motor vehicle equipped with two steering and rolling wheels at the front and a fixed axle drive wheel at the rear.

STATE OF THE ART

In the field of motor vehicles there is a growing supply of "hybrid" vehicles which combine the characteristics of motorcycles in terms of handling, with the stability of four-wheeled vehicles.

Such models are represented, for example, by three-wheeled motor vehicles equipped with two front steering wheels and four wheel motor vehicles known as QUADs.

More specifically, the aforementioned three-wheeled motor vehicles are provided with two steering and rolling wheels (i.e. tilting or inclining) at the front and a fixed axle drive wheel at the rear. The rear wheel is intended to provide torque and thus allow traction while the front wheels, paired, are intended to provide the directionality of the vehicle. The paired wheels at the forecarriage can tilt and roll as well as steer. Thanks to this solution compared to three-wheeled motor vehicles with two wheels at the rear, motor vehicles with two wheels at the forecarriage are like an actual motorbike since, just like a motorbike, the vehicle is able to incline in a curve. Compared to a motor vehicle with only two-wheels, such vehicles with two paired wheels on the forecarriage have however a greater stability ensured by the double support on the ground of the front wheels, similar to that provided by a car.

The front wheels are kinematically connected to each other by means of kinematic mechanisms which enable the same to roll synchronously and in a specular manner for example through the interposition of articulated quadrilaterals. Such vehicles are further provided with two independent suspensions, one for each of the two front wheels, equipped with shock absorbers which are also independent.

Rolling, three-wheeled motor vehicles are thus designed to provide the user with the handling of a two-wheel motorcycle and, at the same time, the stability and safety of a four-wheeled motor vehicle.

A rolling three-wheeled motor vehicle of this type is described for example in the Italian patent application no. IT2003MIA001108 on behalf of the same applicant.

Due to the structural peculiarities of this type of motor vehicle it is possible that under particular travel conditions, for example, at very low speeds or during breaks or stops the vehicle may fall over as a result of an accidental and/or uncontrolled rolling movement.

This problem has been addressed by equipping the aforesaid vehicles with roll block systems, operated by the user manually or by an automatic control system.

A roll block system for such motor vehicles is described for example in the Italian patent application no. IT2004A000171 on behalf of the same applicant. The roll block system is described in relation to a rolling motor vehicle equipped with a steering system with an articulated quadrilateral structure and two independent front suspensions. The roll block system comprises: a mechanical caliper suitable to block the movements of the articulated quadrilateral so as to prevent the rolling permitted by it; two hydraulic calipers operated simultaneously by an electric motor acting on rods placed in parallel with the shock absorbers so as to prevent the rolling caused by asymmetric spring suspension movements of the two wheels.

A first disadvantage of the block system described above lies in its complexity. It requires in fact three separate blocking devices: one acting on the articulated quadrilateral; two on the shock absorbers.

This system also has the disadvantage of making the motor vehicle rigid not only to the rolling movements caused by the quadrilateral and/or by asymmetric spring suspension movements, but also to the pitching movements (symmetrical spring suspension movements).

Blocking of the pitching requires adequate dimensioning of the blocking devices of the shock absorbers with increased production costs. In fact, in the event of the vehicle suffering impact from the road (e.g. from a hole) with the rolling blocked, the blocking system must be able to overcome the impulsive peak of the impact force to avoid changing the geometric configuration of the suspension.

In some situations, blocking pitching may also have consequences on the behaviour of the vehicle and thus on safety. For example, if a front wheel were subjected to an impact such as to overcome the force of the blocking device of the relative shock absorber, the wheel would lift and the motor vehicle would thus be lowered on that side. Once the impact were over the blocking device would keep the vehicle in the new position reached, thus placing the motor vehicle in an unsafe configuration.

Parallel blocking of the shock absorbers also has consequences when braking. The vehicle is, in fact, "blocked" in a situation of balance different from that one which would be statically required, since the forecarriage is blocked lower down, under a load resulting from the sum of the static load and the dynamic transfer due to braking.

Other anti-roll systems intended for rolling motor vehicles provided with a steering system with an articulated quadrilateral structure are described in the European patent application EP2810861A1, the French patent FR2953184 and the European patent EP2345576B1. Such anti-roll systems operate directly on the articulated quadrilateral structure and block the rolling by blocking the movement of the articulated quadrilateral. These anti-roll systems are not however capable of inhibiting rolling movements due to the asymmetric shaking permitted by the shock absorbers of the two front wheels.

In addition, the anti-roll systems mentioned above, since specifically designed to operate on a steering system with an articulated quadrilateral structure, are directly bound to the presence of this structure and its mechanical configuration.

There is therefore a need to develop a rolling motor vehicle equipped with a roll block system which overcomes entirely or in part the limitations set out above.

PRESENTATION OF THE INVENTION

The purpose of the present invention is therefore to eliminate or at least reduce, the problems mentioned above relative to the prior art, by providing a forecarriage of a rolling motor vehicle equipped with a roll block system which, when activated, does not inhibit the pitching of the motor vehicle due to a symmetric compression of the shock absorbers and does not affect the steering.

A further purpose of the present invention is to make available a forecarriage of a rolling motor vehicle equipped with a roll block system which is constructively simple and inexpensive to produce and fit to said motor vehicle.

DESCRIPTION OF THE DRAWINGS

The technical characteristics of the invention can be seen clearly from the contents of the following claims and the advantages of the same will be more clearly comprehensible from the detailed description below, made with reference to the appended drawings, showing one or more embodiments by way of non-limiting examples, wherein:

FIG. 1b shows a plan view of the motor vehicle shown in FIG. 1a, from the side of the arrow I in FIG. 1a;

FIG. 2 shows a front view of the motor vehicle in FIG. 1 from the side of the arrow II in FIG. 1;

FIG. 3 shows a partial perspective view of the forecarriage of the motor vehicle in FIG. 1;

FIG. 10 shows a partial perspective view of a motor vehicle equipped with a forecarriage with a roll block system according to a third embodiment of the invention;

FIG. 11 shows a view of a detail of FIG. 10;

DETAILED DESCRIPTION

Figure 1A:
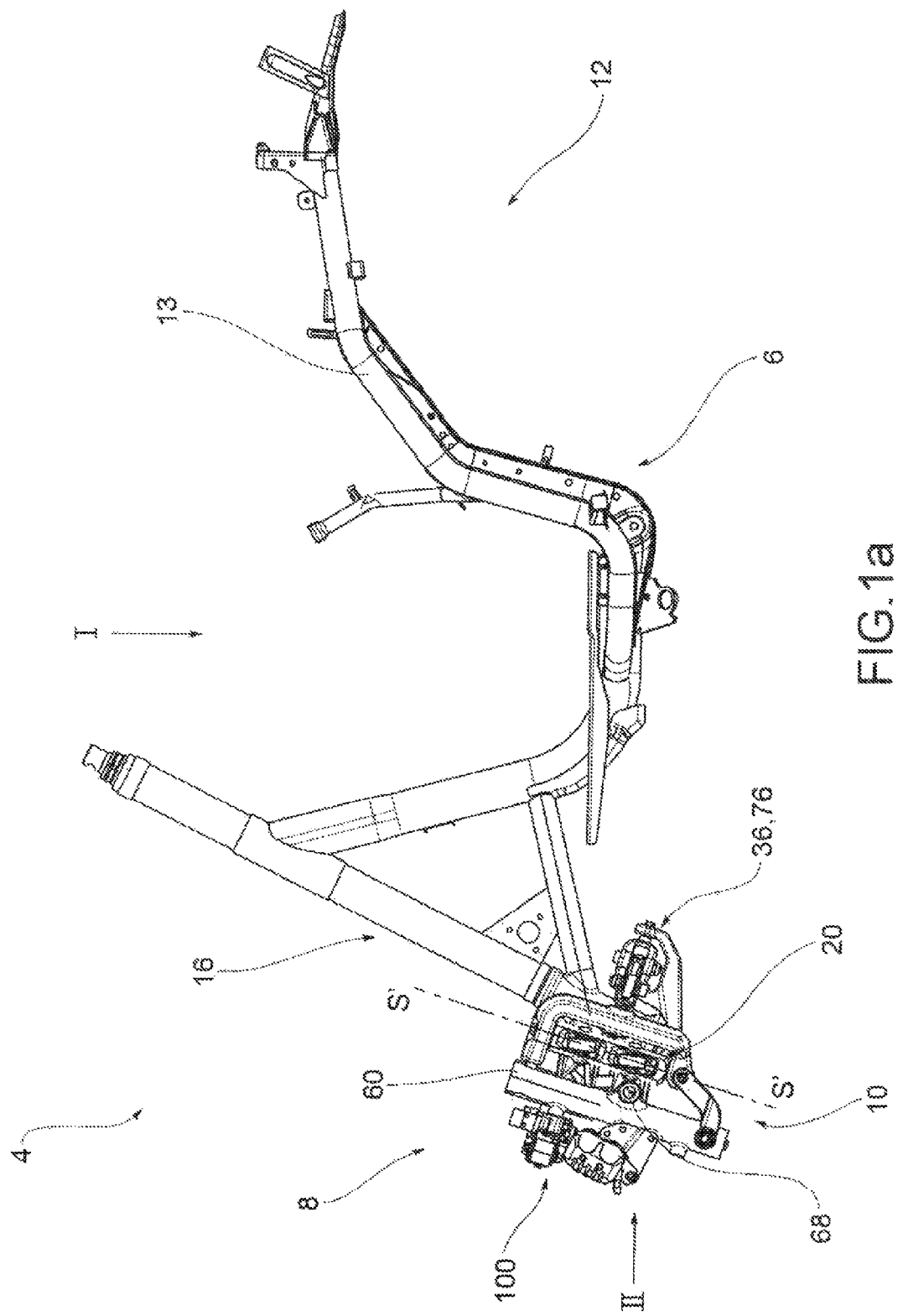
FIG. 1a shows a side view of a motor vehicle with a forecarriage fitted with a roll block system according to a first embodiment of the invention, illustrated with some parts removed to better show others.

With reference to the aforementioned figures, reference numeral 4 globally denotes a motor vehicle according to the present invention.

For the purposes of the present invention, it should be pointed out that the term motor vehicle should be considered in a broad sense, encompassing any motor cycle having at least three wheels, i.e. two aligned wheels, as described better below and at least one rear wheel. Such definition therefore also comprises so-called quad bikes having two wheels on the forecarriage and two wheels on the rear.

The motor vehicle 4 comprises a frame 6 extending from a forecarriage 8, supporting at least two front wheels 10, to a rear 12 supporting one or more rear wheels 14. It is possible to distinguish a left front wheel 10' and a right front wheel 10" in which the definition of left and right 10', 10" is purely formal and means in relation to a driver of the vehicle. Said wheels are arranged to the left and right of the centreline plane M-M of the motor vehicle, compared to a point of observation of a driver driving it.

In the following description, and also in the drawings, reference will be made to symmetrical or specular elements of the forecarriage with respect to said centreline plane M-M using the quotes ' and " to indicate respectively the components to the left and right of the forecarriage, compared to a point of observation of a driver driving it.

For the purposes of the present invention, the frame 6 of the motor vehicle may be any shape, size and may for example be of the lattice type, box type, cradle, single or double, and so forth. The frame 6 of the motor vehicle may be in one piece or in multiple parts; for example the frame 6 of the motor vehicle interconnects with a rear frame 13, which may comprise an oscillating rear fork (not shown) which supports one or more rear drive wheels 14. The aforesaid rear oscillating fork may be connected to the frame 6 by direct hinging or by the interposition of a lever mechanism and/or intermediate frames.

According to a general embodiment of the present invention, the motor vehicle forecarriage 8 comprises a forecarriage frame 16 and a pair of front wheels 10', 10" kinematically connected to each other and to the forecarriage frame 16 by means of a first kinematic mechanism 20 which enables the same to roll in a synchronous and specular manner.

Each wheel 10', 10" is connected to the aforesaid first kinematic mechanism 20 by means of a respective axle journal 60 which is mechanically connected to a rotation pin 68 of the wheel in order to support it rotatably around an axis of rotation R'-R', R"-R".

The "axle journal" of a wheel is understood to be the mechanical part of the motor vehicle designed to support the rotation pin of said wheel and to interconnect it kinematically to the suspensions, the steering device and to the aforesaid first kinematic mechanism 20. The axle journal has no degrees of freedom with respect to the wheel pin and is therefore kinematically integral therewith. The axle journal may be made in one piece with the wheel pin or be mechanically constrained to it to form a single piece.

The forecarriage 8 of the motor vehicle further comprises:
a roll block system 100, and
suspension means 90 which guarantee each axle journal 60 at least one spring suspension movement with respect to the first kinematic mechanism 20.

The first kinematic mechanism 20 can have any configuration as long as it is functional to enable the front wheels to roll in a synchronous and specular manner.

In particular, such first kinematic mechanism may be a system configured as an articulated parallelogram system, or be a suspended longitudinal arms system.

Figure 13:
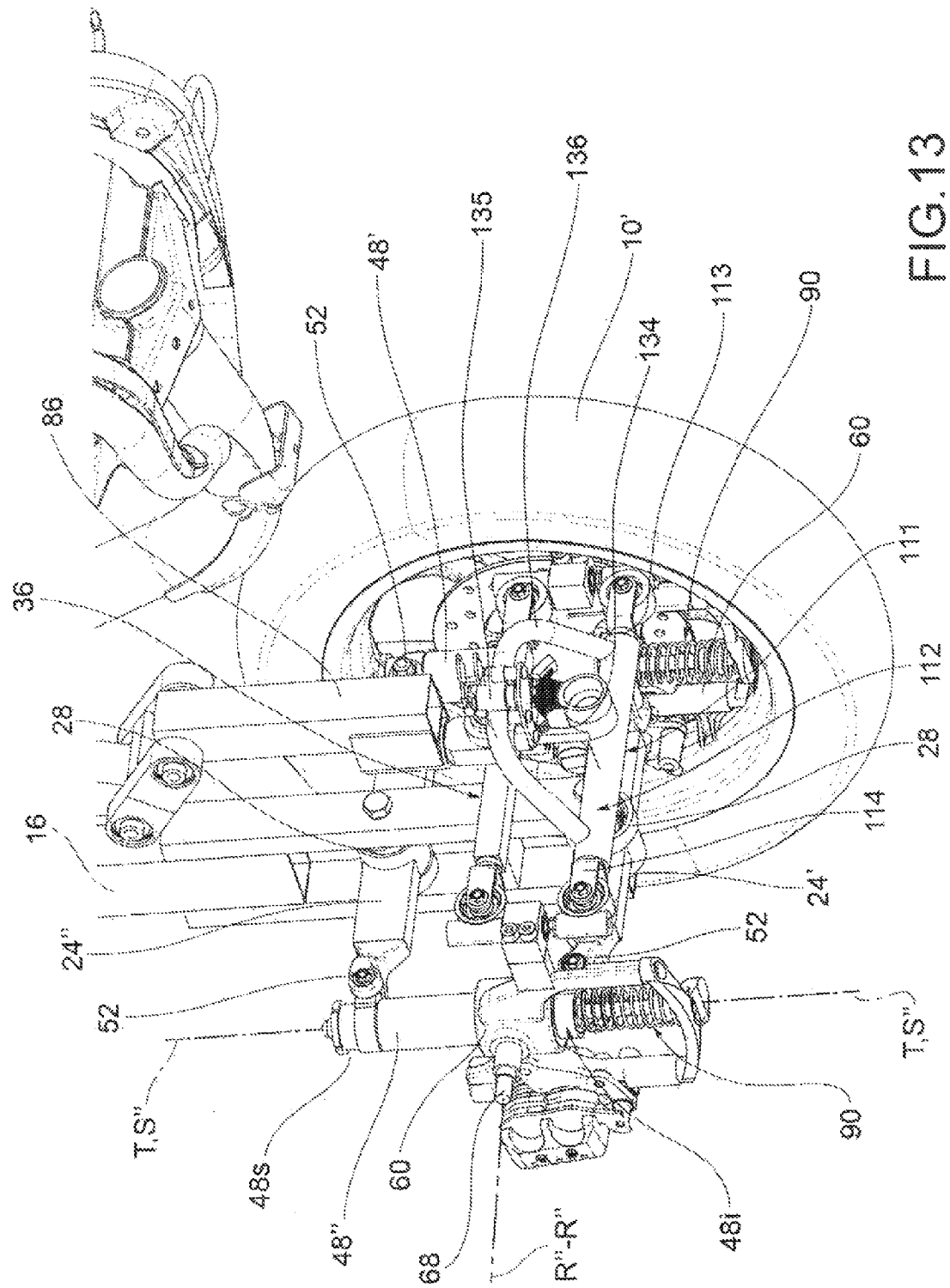
FIG. 13 shows a rear perspective view of a detail of a forecarriage of a motor vehicle with a roll block system according to a fourth embodiment of the invention with a spring suspension steering bar.

In particular, the forecarriage 8 is provided with a steering device 36, 86 suitable to command the rotation of the axle journals 60 around respective steering axes S'-S', S"-S" of each front wheel 10', 10". The steering device may act directly on the axle journals 60 and be subject to the action of the suspensions (as shown in FIG. 13) or act indirectly on the axle journals without being subjected to the action of the suspensions (as shown for example in FIGS. 1-3 or in FIGS. 17-19).

Preferably, as shown in the appended drawings, the aforesaid first kinematic mechanism 20 is an articulated quadrilateral system.

In more detail, as shown in the examples of FIGS. 1 to 24, such articulated quadrilateral system comprises a pair of cross members 24', 24", hinged to the forecarriage frame 16 in correspondence of middle hinges 28. The cross members 24', 24" are connected together, at opposite transversal ends 40, 44 by uprights 48,48',48" pivoted at said transversal ends 40, 44 at side hinges 52. The cross members 24 and the uprights 48 define the aforesaid articulated quadrilateral 20.

Operatively, each of the uprights 48 guides and supports an axle journal 60 of one of said front wheels 10', 10".

Advantageously, as provided for example in the embodiments shown in FIGS. 12, 13, 17, 18 and 19, the first articulated quadrilateral kinematic mechanism 20 may be made in such a way that each of the uprights 48 guides and supports the axle journal 60 of the respective front wheel 10', 10" coaxially to its main extension axis T-T. In such case, the suspension means 90 of each front wheel are integrated in the relative upright and guarantee the axle journal 60 a rectilinear spring suspension movement along the main extension axis T-T of the upright 48.

More specifically, the axle journal 60 comprises a sleeve 88 placed coaxially to the upright 48. Between the axle journal 60 and the upright 48 are arranged suspension means 90 of the wheel 10. For example, the suspension means 90 comprise a spring and/or a damper.

In particular, the uprights 48 are hollow so as to house internally, at least partially, the suspension means. Preferably the suspension means 90 are arranged coaxially to the respective upright 48.

Preferably, according to such embodiments, the coupling between each axle journal 60 and the respective upright 48 is of the cylindrical type, so as to allow both translation and rotation of the axle journal 60 with respect to the main extension axis T-T of the upright 48. Each front wheel 10', 10" has a steering axis S'-S', S"-S" which coincides with the main extension and symmetry axis T-T of the relative upright 48', 48".

In particular, each upright 48, 48', 48" extends from an upper end 48s to a lower end 48i. The rotation pin 68 of each front wheel 10', 10" (integral with the axle journal 60) is placed between the upper end 48s and the lower end 48i of the corresponding upright 48', 48" of the first articulated quadrilateral kinematic mechanism 20.

Alternatively, as provided for in the embodiments shown in FIGS. 1 to 5 and in FIGS. 10 and 11, the first articulated quadrilateral kinematic mechanism 20 may be made in such a way that each of the uprights 48 guides and supports the axle journal 60 of the respective front wheel 10', 10" externally to itself by means of a roto-translational type kinematic connection system.

More specifically, each axle journal 60 is supported by a support bracket 65 which in turn is hinged to the aforementioned articulated quadrilateral 20 by means of steering hinges 76 arranged in correspondence of the upper 48s and lower 48i ends of each upright 48', 48". Said steering hinges 76 define the respective steering axes S'-S', S"-S" of the wheels 10', 10", parallel to each other.

More specifically, as shown in particular in FIG. 11, the axle journal 60 is hinged to the support bracket 65 at opposite upper and lower axial ends by means of at least three tilting hinges 65a, 65b, 65c which define respective tilting axes B-B and which realise a roto-translational connection between the axle journal 60 and the support bracket 65. In particular, the axle journal 60 is hinged to the support bracket 65 via a connecting rod 66 by means of two of said hinges 65b and 65c.

The suspension means 90 of each front wheel may, in particular, be integrated in the respective axle journal 60. More specifically, the axle journal 60 comprises a sheath inside which a spring is inserted (not visible in the figures) mechanically connected by means of a rod to the support bracket. The sheath is movable with respect to the rod under the effect of the spring.

Operatively, such system defines a spring suspension movement along a curvilinear trajectory.

According to an embodiment not illustrated in the appended figures, the aforesaid first kinematic mechanism 20 may be a system with two suspended arms.

More specifically, such a system may comprise, in particular, two suspended arms, hinged at their first ends to the forecarriage frame to rotate about a common axis of rotation, transverse to the centreline plane M-M of the motor vehicle. At its second ends, opposite the first, both said arms are suspended by suspension means, in turn supported by a rocker arm, hinged to the forecarriage frame. The rolling movement of the two front wheels 10' and 10" is permitted by the oscillation of the two suspended arms and the rocker arm 203. Each suspended arm supports at its second end an axle journal 60 of one of the two front wheels 10' and 10". In particular, each axle journal 60 is rotationally connected to the respective suspended arm to rotate about its own steering axis S-S. The steering device acts on two gripping portions integral with the axle journals.

According to the invention, the aforesaid roll block system 100 comprises a second kinematic mechanism 110 which directly connects the two front wheels 10', 10" to one another at the respective axle journals 60 by means of hinging means and is free to extend in length parallel to a joining direction of the two axle journals.

Operatively, the aforesaid second kinematic mechanism 110 is susceptible to take on at least two different configurations:
- a free configuration, wherein the aforesaid second kinematic mechanism 110 is configured to passively follow the movements of the two wheels 10', 10" with respect to each other and with respect to the frame 16 without interfering with them; and
- a blocked configuration, wherein the aforesaid second kinematic mechanism 110 is configured to block the angle α formed by a lying plane of at least one wheel with respect to the ground, said lying plane being orthogonal to the axis of rotation R'-R', R"-R" of said wheel.

In the blocked configuration the aforesaid second kinematic mechanism prevents the rolling movements of the two wheels at the same time freeing the symmetric spring suspension (pitching) and steering movements.

The aforesaid roll block system 100 further comprises a control device 120 of the configuration of the second kinematic mechanism 110 which is suitable to act on the second kinematic mechanism 110 to take it from the free configuration to the blocked configuration and vice versa.

The blocking of the angle of a wheel also leads to the blocking of the angle of the other wheel given that the two front wheels 10', 10" are kinematically connected together by means of said first kinematic mechanism 20 to roll in a synchronous and specular manner.

Advantageously, the aforementioned control device 120 acts on the second kinematic mechanism 110 to bring it from the free configuration to the blocked configuration and vice versa following a predetermined control logic set up by an automatic electronic actuation system.

Alternatively or in addition to the automatic operation, the control device can act on the second kinematic mechanism 110 to bring it from the free configuration to the blocked configuration and vice versa following manual controls imposed by the user of the motor vehicle via a manually operated system.

Preferably, the manual commands set by the user are filtered by an electronic control system according to a main operating logic of the motor vehicle aimed at ensuring the safety thereof.

As noted in the introduction, in the technical solutions of the prior art blocking of the rolling is performed by blocking all the elements responsible for the rolling, i.e. arms, forks, rocker arms and suspensions. Differently, according to the present invention, blocking of the rolling is performed by interconnecting the two front wheels operating on only two elements, i.e. the axle journals of the wheels.

The interconnection of the two wheels at the respective axle journals makes the roll block system according to the present invention selective towards rolling movements.

As noted previously, the suspension means 90 guarantee each axle journal at least one spring suspension movement with respect to the first kinematic mechanism 20. The axle journals are thus associated to the wheels in the spring suspension movements. For this reason, their mutual interconnection via the roll block system according to the invention (even in the blocked configuration) does not interfere with the pitching movements (symmetrical spring suspension movements). It follows therefore that the roll block system is transparent to the pitching movements.

In addition, thanks to the fact that the second kinematic mechanism 110 directly connects the two axle journals 60 and is free to extend in length parallel to a joining direction of the two axle journals, the roll block system 100 according to the invention (even in the blocked configuration) does not interfere with the steering movements. The extensibility of the second kinematic mechanism allows influencing neither parallel steering nor kinematic steering. It follows therefore that the roll block system is also transparent to the steering.

It emerges therefore from the above that in the blocked configuration the roll block system 100 according to the invention only prevents rolling movements (also deriving from asymmetric spring suspension movements), leaving instead free the pitching (symmetrical spring suspension) and steering movements, while in the free configuration the roll block system 100 according to the invention does not introduce any kinematic uncorrection of the movements of the wheels due to steering, rolling (also from asymmetrical spring suspension) and pitching (symmetrical spring suspension).

Lastly, thanks to the fact that the roll block system 100 acts directly on the axle journals and not on the first kinematic mechanism which enables the wheels to roll synchronously and in a specular manner, the roll block system 100 according to the invention is not directly bound to the presence of such first kinematic mechanism and its mechanical configuration.

Preferably, the aforesaid second kinematic mechanism 120 consists of one or more rods extensible in length 111, 112 each of which connects the two front wheels 10', 10" directly to each other at the respective axle journals 60 at its two ends by means of the aforesaid hinging means.

The aforementioned control device 120 of the configuration of the second kinematic mechanism 110 is operatively connected to each of said one or more extensible rods 111, 112 to reversibly block the lying position of the latter with respect to a vertical projection plane transverse to a centreline plane M-M of the motor vehicle.

The "lying position" of a rod with respect to a vertical projection plane transverse to a centreline plane M-M of the motor vehicle means the angle formed by the projection of the rod on said vertical plane.

Said vertical projection plane substantially corresponds to the rolling plane. Therefore, the vertical projection plane results to be perfectly orthogonal to the centreline plane M-M, when the wheels are parallel to centreline plane, or results to be inclined with respect to the centreline plane M-M, when the wheels are steering.

In other words, said control device 120 is able to selectively block the movements of the extensible rods 111, 112 cinematically corresponding to rolling movements of the wheels 10', 10".

Operatively, the blocking of the lying position of said one or more extensible rods with respect to a vertical projection plane transverse to a centreline plane M-M of the motor vehicle automatically determines the blocking of the angle α formed by a lying plane of at least one wheel relative to the ground. Said one or more rods—insofar as placed to connect the axle journals of the two wheels to their two ends—are obliged to follow the rolling movements of the two wheels varying their lying position with respect to a vertical projection plane transverse to a centreline plane M-M of the motor vehicle. At the moment in which the lying position of said one or more rods is forcibly blocked, by virtue of the aforesaid connection, the lying position of the respective wheels also results blocked, and accordingly the rolling movements of the two wheels, corresponding to variations of the angle α formed by a lying plane of each wheel relative to the ground, are blocked.

The blocking of the angle of a wheel also leads to the blocking of the angle of the other wheel given that the two front wheels 10', 10" are kinematically connected together by means of said first kinematic mechanism 20 to roll in a synchronous and specular manner.

As already said, all this applies regardless of the configuration of said first kinematic mechanism 20, which may in particular be an articulated quadrilateral or suspended arms.

In the free configuration, the aforementioned one or more extensible rods 111, 112 are free to change its lying position with respect to said projection plane, while in the blocked configuration the aforesaid one or more extensible rods 111, 112 are prevented from changing its lying position with respect to said projection plane, thereby leading to the blocking of the rolling movements of the two wheels connected to them via the axle journals.

Preferably, the aforesaid hinging means, with which each of said one or more extensible rods 111, 112 is connected at both its ends to the axle journals 60, consist of a ball joint or of a device kinematically equivalent to a ball joint. This way, the second kinematic mechanism 120 is able to second the reciprocal movements of the two front wheels 10', 10" one to each other and with respect to the forecarriage frame 16 without causing jamming or blocks.

In particular, the aforesaid device kinematically similar to a spherical joint may consist of a pair of cylindrical hinges with axes orthogonal to each other.

Preferably, this hinging solution is adopted in the case in which said one or more extensible rods 111, 112 lie and move on a plane substantially parallel to the two front wheels of a rolling plane defined by said first kinematic mechanism 20. This occurs in particular in the case in which the first kinematic mechanism is composed of an articulated quadrilateral in which the uprights guide the movement of the axle journals according to a rectilinear motion (see FIG. 13).

The "rolling plane" is understood to mean a plane transverse to the longitudinal direction X-X or direction of travel of the motor vehicle, and thus incident to the centreline plane M-M of the motor vehicle. Advantageously, in such case one of the two hinges of such pair has its own hinging axis orthogonal to the rolling plane of the two front wheels 10', 10", in such a way that the second kinematic mechanism 110 can move parallel to the aforesaid rolling plane when it finds itself in the free configuration.

In general, and in particular in cases in which the first kinematic mechanism does not allow a rectilinear spring suspension movement of the axle journals, it is preferable for the hinging means of said one or more rods to consist of ball joints (see for example FIGS. 10 and 11), so as to prevent jamming in the movements of said one or more rods 111, 112.

Advantageously, the ball joints 71 or the pairs of hinges 72, 73 are connected to the axle journals 60 by means of support elements 63 integral with said axle journals.

Preferably, each of said one or more rods extensible in length 111, 112 is formed of at least two portions 113, 114 telescopically associated to one another according to a main direction of longitudinal extension. Preferably, such two portions 113, 114 of the rod 111, 112 are associated to each other with a cylindrical coupling to allow a relative free rotation around said main direction of longitudinal extension.

In general, said one or more rods extensible in length 111, 112 may have any orientation with respect to the ground.

Preferably, as provided for in the embodiments illustrated in the appended drawings, each of said one or more rods extensible in length 111, 112 connects the two axle journals 60 at the same height relative to the ground, so as to be parallel to the ground. In the case in which the first kinematic mechanism 20 consists of an articulated quadrilateral, said one or more rods 111, 112 are substantially parallel to the cross members 28 of the articulated quadrilateral.

Preferably, each of said one or more rods extensible in length 111, 112 connects the two axle journals 60 to each other in a position as close as possible to the respective steering axes S'-S'; S"-S" of the two front wheels in order to minimize the changes in length on the rods.

According to a preferred first general embodiment, the second kinematic mechanism 110 consists of a single rod extensible in length 111 which directly connects the two front wheels 10', 10" to each other at the respective axle journals 60.

Such technical solution is adopted in the specific embodiments illustrated in FIGS. 1 to 9 and in FIG. 13.

Preferably, the aforesaid single rod 111 is formed of at least two portions telescopically associated to one another according to a main direction of longitudinal extension.

Preferably, the two portions of the rod 111, 112 are associated to each other with a cylindrical coupling to allow a relative free rotation around said main direction of longitudinal extension.

The aforesaid single extensible rod 111 may be fixed to the axle journals 60 at each of its two ends by means of a ball joint or devices kinematically similar to a ball joint.

Advantageously, the aforesaid control device of the configuration of the second kinematic mechanism 110 comprises releasable means to block the lying position of said single rod 111 with respect to a vertical projection plane transverse to a centreline plan M-M of the motor vehicle.

Preferably, said single extensible rod 111 is connected at its end or at both ends thereof to the respective axle journal by means of hinging means consisting of a pair of cylindrical hinges having axes orthogonal one to the other, in which the rotation axis of a first hinge of said pair is orthogonal to a rolling plane of the two front wheels 10', 10". This way the single extensible rod 111 can move parallel to said rolling plane when the second kinematic mechanism is in the free configuration.

The aforementioned releasable blocking means of the lying position are suitable to block the rotation of said single rod 111 around said first hinge at one end or at both ends.

Operatively, blocking the rotation of at least one end of the rod 111 with respect to the lying plane means blocking the lying position of said single rod 111 with respect to a vertical projection plane transverse to a centreline plane M-M of the motor vehicle. As explained above, this automatically results in a blocking of the rolling movements not only of the wheel directly affected by the blocking, but also of the other wheel. The blocking of the rotation at both ends is therefore not strictly necessary, but is functional to ensure more secure blocking of the rod.

With the blocking of the rotation of the rod with respect to the hinge with axis orthogonal to the rolling plane the second kinematic mechanism 110 is thus brought into the aforesaid blocked configuration.

The aforementioned releasable blocking means of the lying position can be made in any way suitable for the purpose.

Figure 1B:
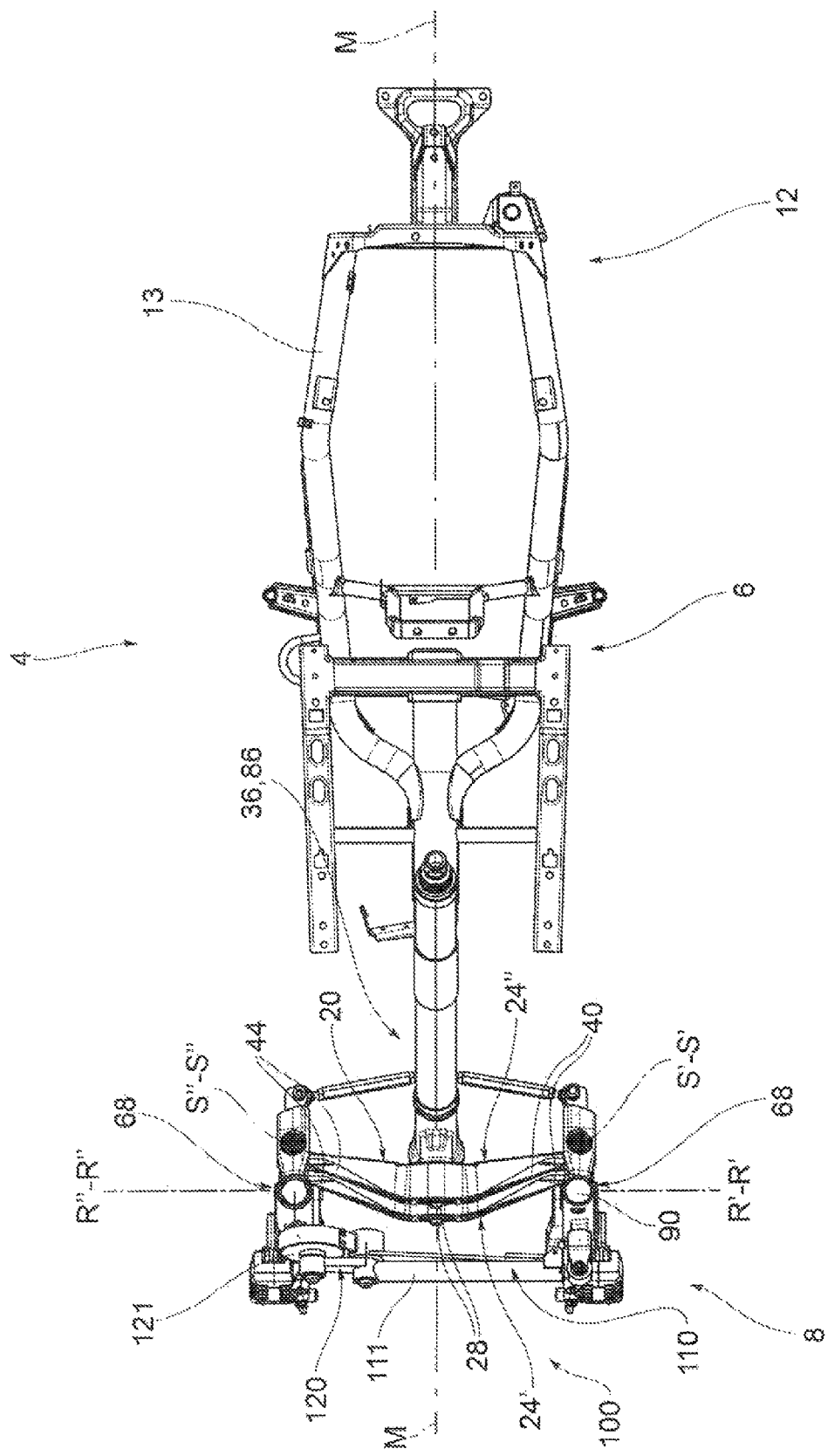
Figure 4:
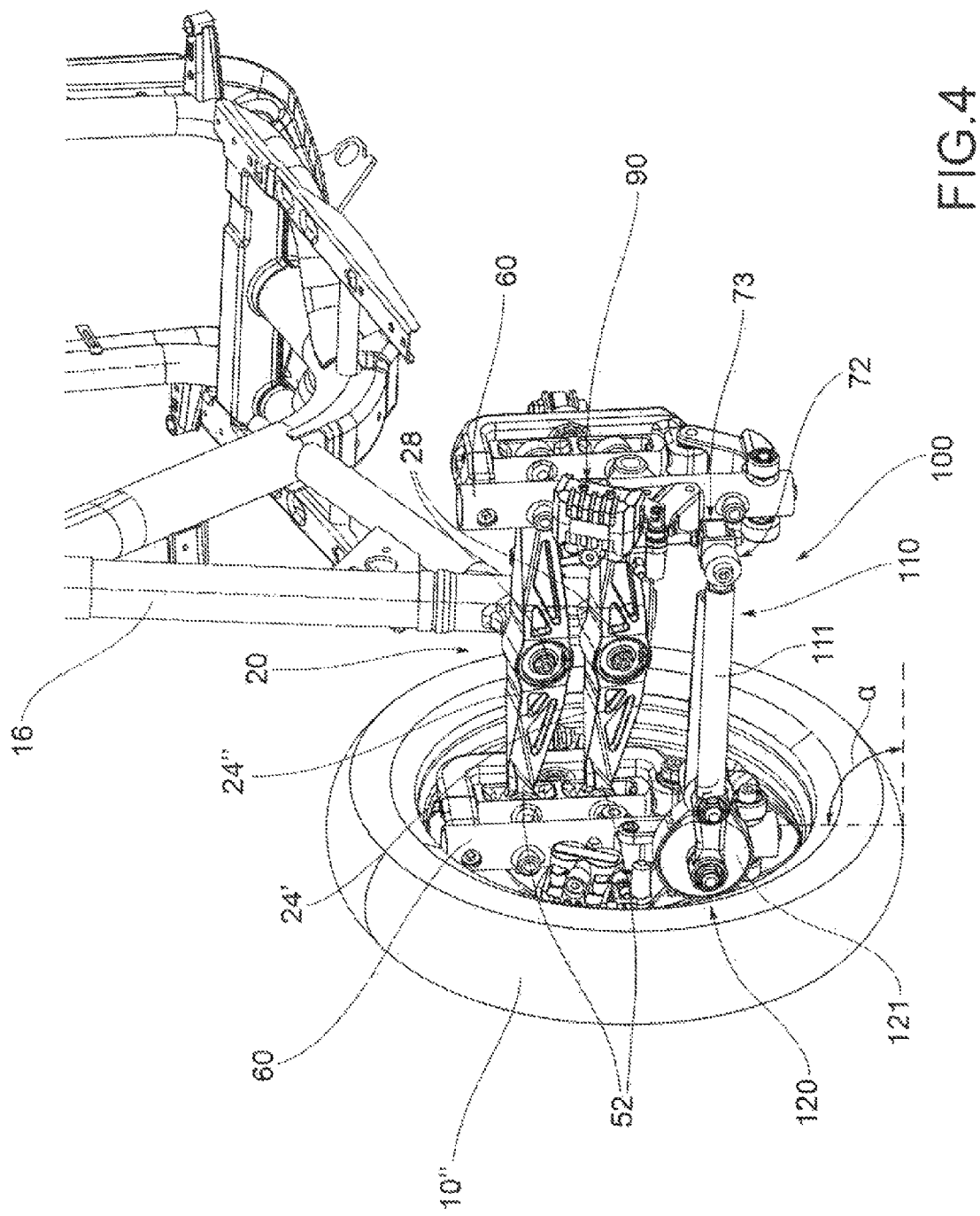
FIG. 4 shows a partial perspective view of the forecarriage of a motor vehicle equipped with a forecarriage with a roll block system according to a variant of said first embodiment of the invention.

According to the embodiments illustrated in FIGS. 1 to 3 and in FIG. 4, the aforesaid releasable means may consist of a single band brake 121 placed at one of the two ends of the rod 111 which is connected to the respective axle journal 60 by means of said pair of cylindrical hinges 72, 73 perpendicular to each other, wherein a first hinge 73 has its axis orthogonal to the rolling plane. The brake band 121 is associated to said first cylindrical hinge to block the rotation thereof in a releasable manner.

Figure 14:
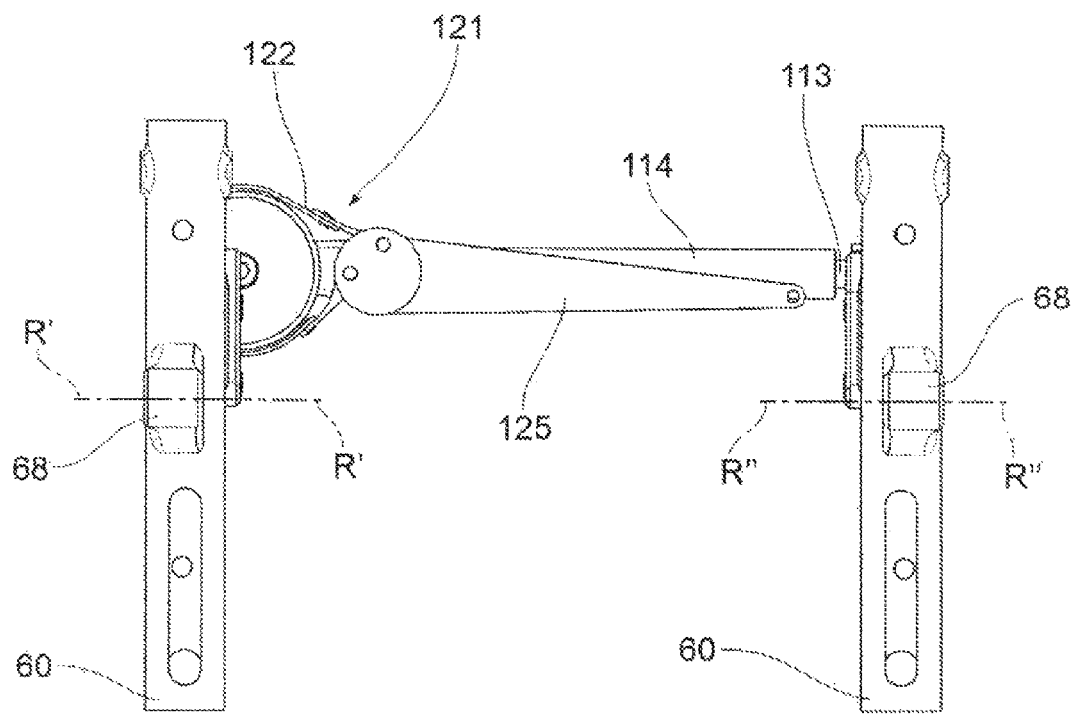
FIGS. 14 and 15 show two orthogonal views, respectively front to back and a plan view from above, of a detail relative to the second kinematic mechanism present in the embodiment shown in FIG. 4.
Figure 15:
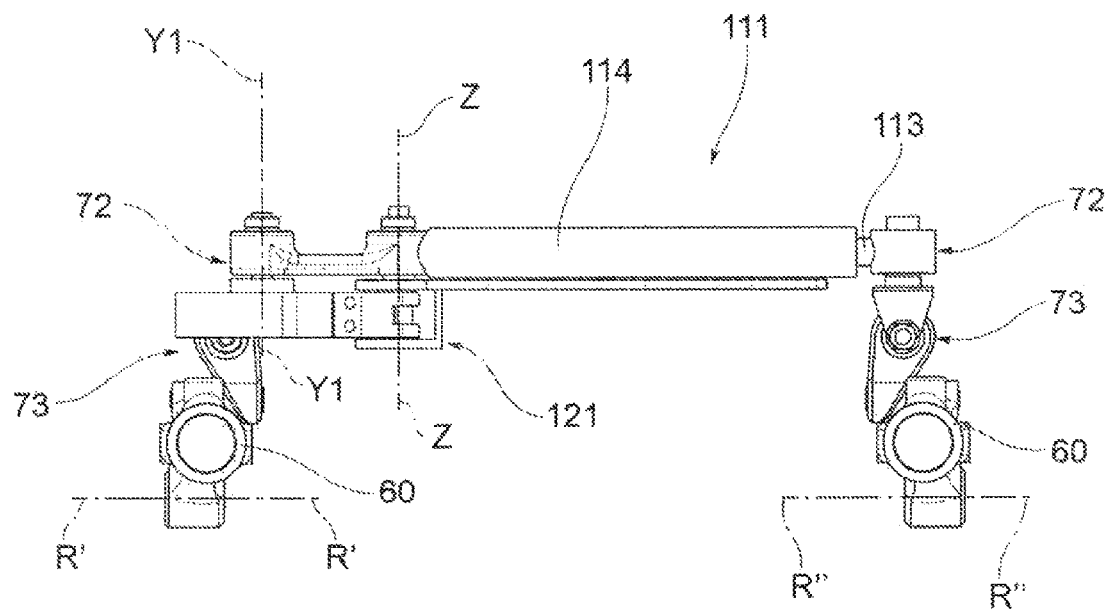
Figure 16:
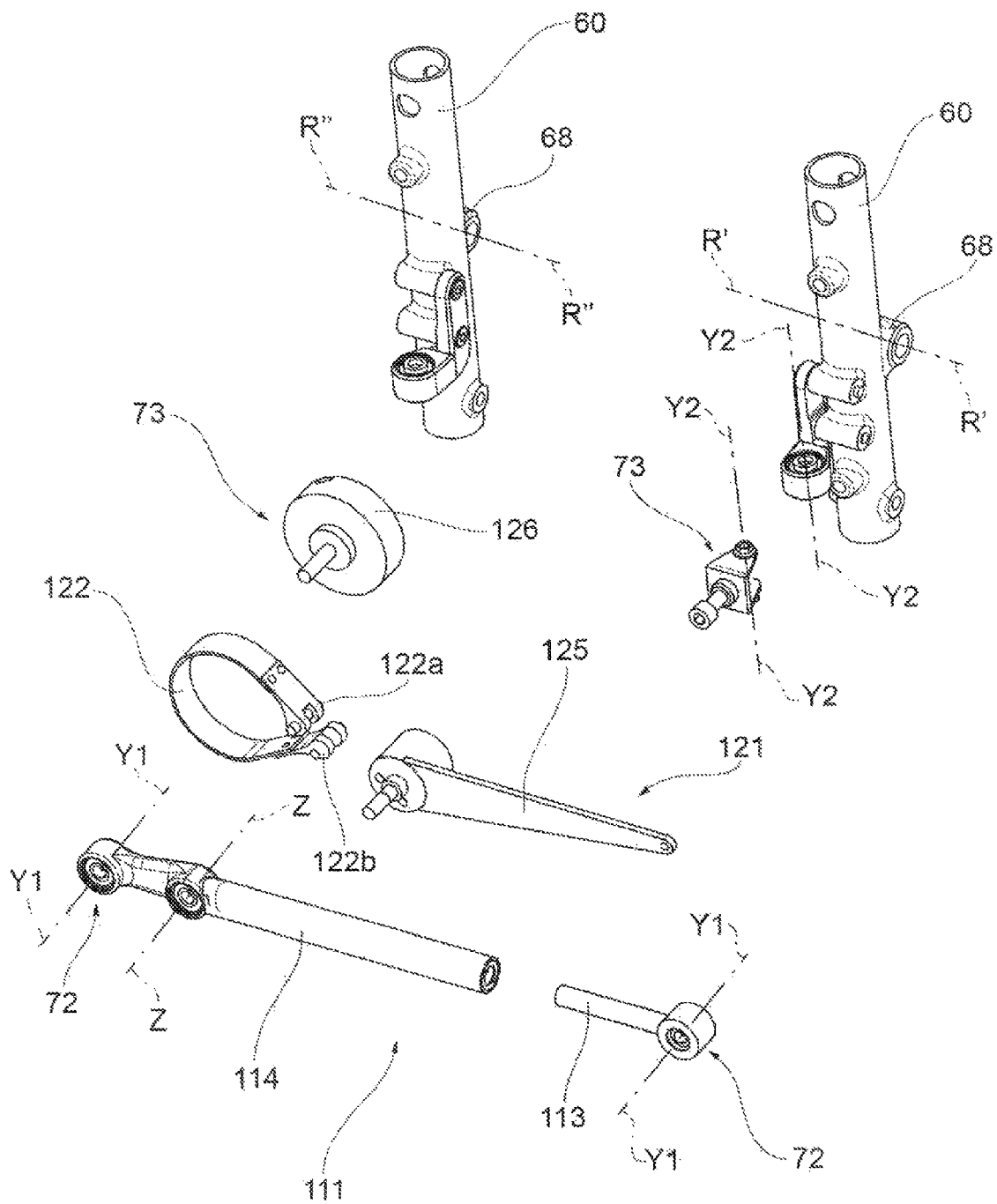
FIG. 16 shows an exploded perspective view of the second kinematic mechanism shown in FIGS. 14 and 15.

More in detail, as shown in FIGS. 14, 15 and 16, the extensible rod 111 is formed of two telescopic portions associated to each other 113 and 114 along the longitudinal axis of the rod. The rod 111 is connected to the two axle journals at both its ends by a pair of cylindrical hinges 72, 73 perpendicular to each other, wherein a first hinge 72 has its axis Y1-Y1 orthogonal to the rolling plane and the second one has its axis Y2-Y2 parallel to the rolling plane. The band brake 121 is associated to one end of the rod 111 and comprises a drum 126 which is rotationally associated around the axis of the first hinge 72 and is directly associated to the respective axle journal 60 itself defining the second hinge 73. The drum 126 may thus rotate around the axis Y2-Y2. The drum 126 externally supports a band 122, the two ends 122a and 122b of which are fixed to an actuating lever 125 of the brake band. In turn, the actuating lever 125 is pivoted to the same portion of the rod 114 which bears the drum 126 according to a rotation axis Z-Z parallel to the axis Y1-Y1 of the first hinge 72 (perpendicular to the rolling plane). The two ends 122a and 122b of the band 122 are fixed to the actuation lever 125 in different positions with respect to the axis of rotation Z-Z. By actuating the lever 125, the band 122 is tightened around the drum 126 and prevents it from rotating around the axis Y1-Y1 of the first hinge 72, while it is still free to rotate around the axis Y2-Y2.

Figure 5:
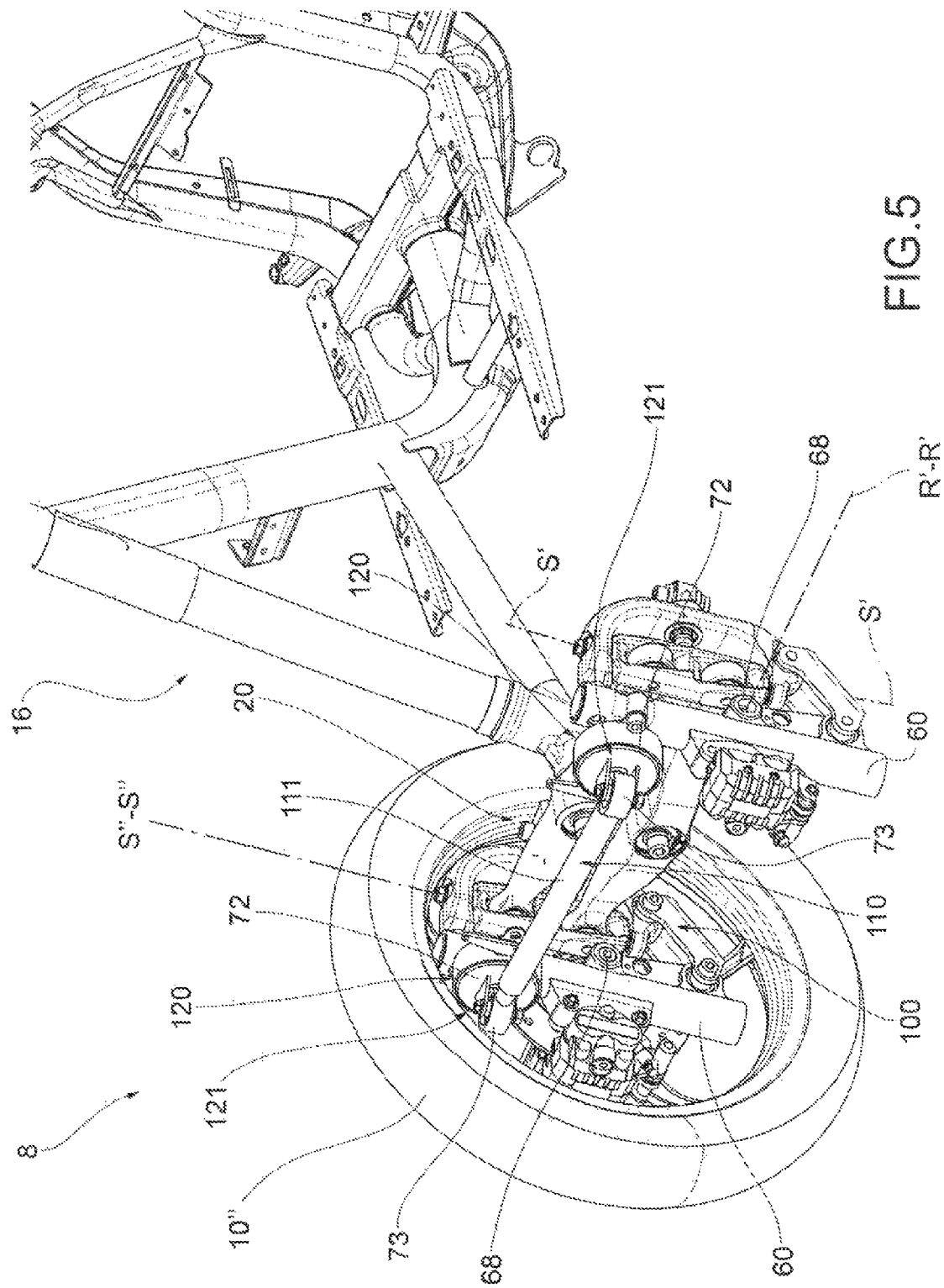
FIG. 5 shows a partial perspective view of the forecarriage of a motor vehicle equipped with a forecarriage with a roll block system according to a further variant of said first embodiment of the invention.

Alternatively, as shown in FIG. 5, the aforesaid single extensible rod 111 is connected to the axle journals 60 at both its ends by a pair of cylindrical hinges 72, 73 perpendicular to each other, wherein the axis of rotation of a first hinge 72 of both pairs of hinges is orthogonal to a rolling plane of the two front wheels of 10', 10". The releasable means comprise a brake band 121 positioned at each end of said single rod 111. Each brake band 121 is associated to the first cylindrical hinge to block the rotation thereof in a releasable manner. The brake band structure is similar to that described in relation to the embodiments illustrated in FIGS. 1 to 4.

Alternatively to the brake band, the releasable blocking means may consist of a brake drum (not shown in the appended drawings).

Alternatively, any blocking system suitable for the purpose can be used, such as a disc brake or a ratchet system.

Figure 6:
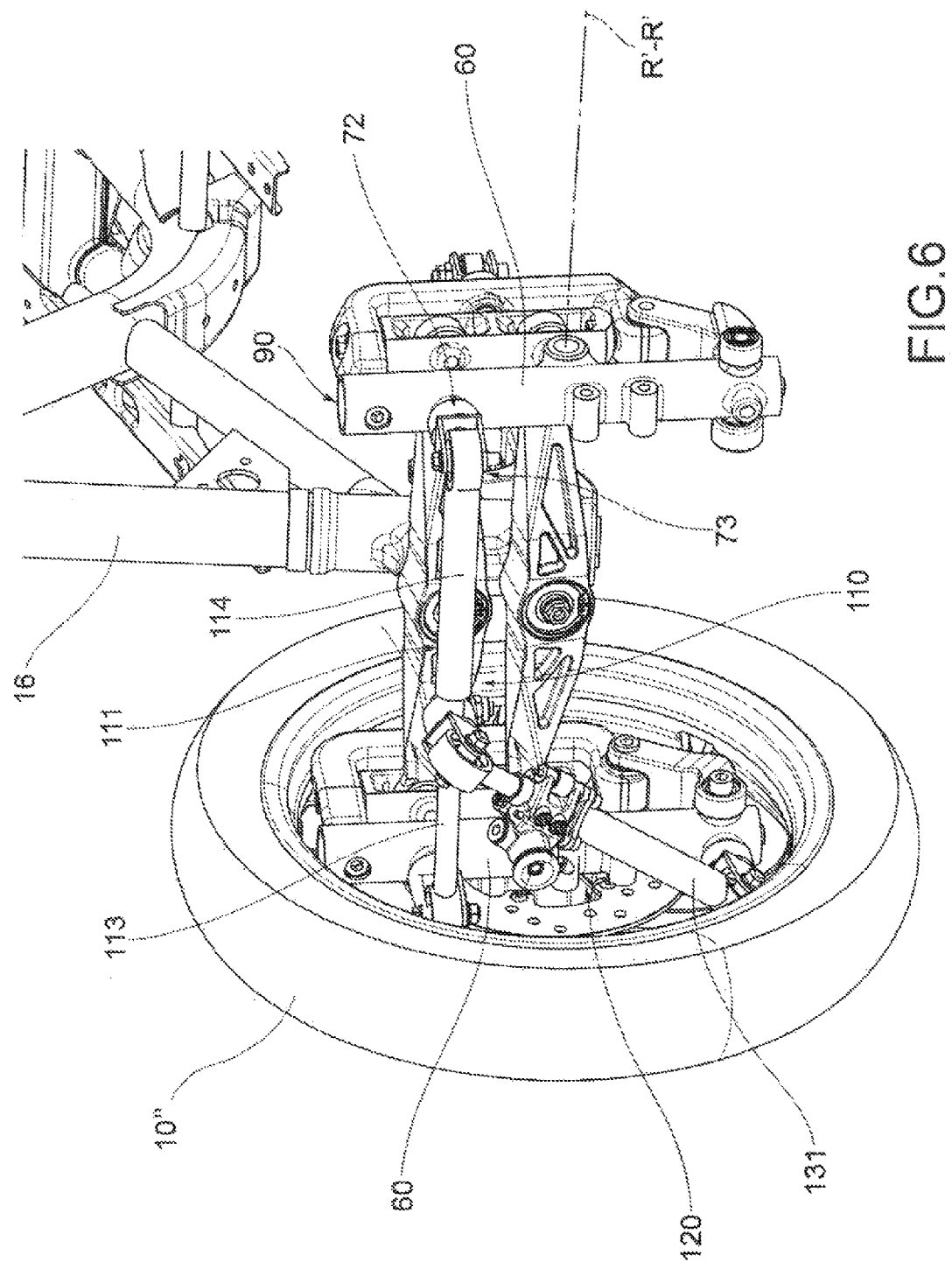
FIG. 6 shows a partial perspective view of the forecarriage of a motor vehicle equipped with a forecarriage with a roll block system according to a second embodiment of the invention.
Figure 7:
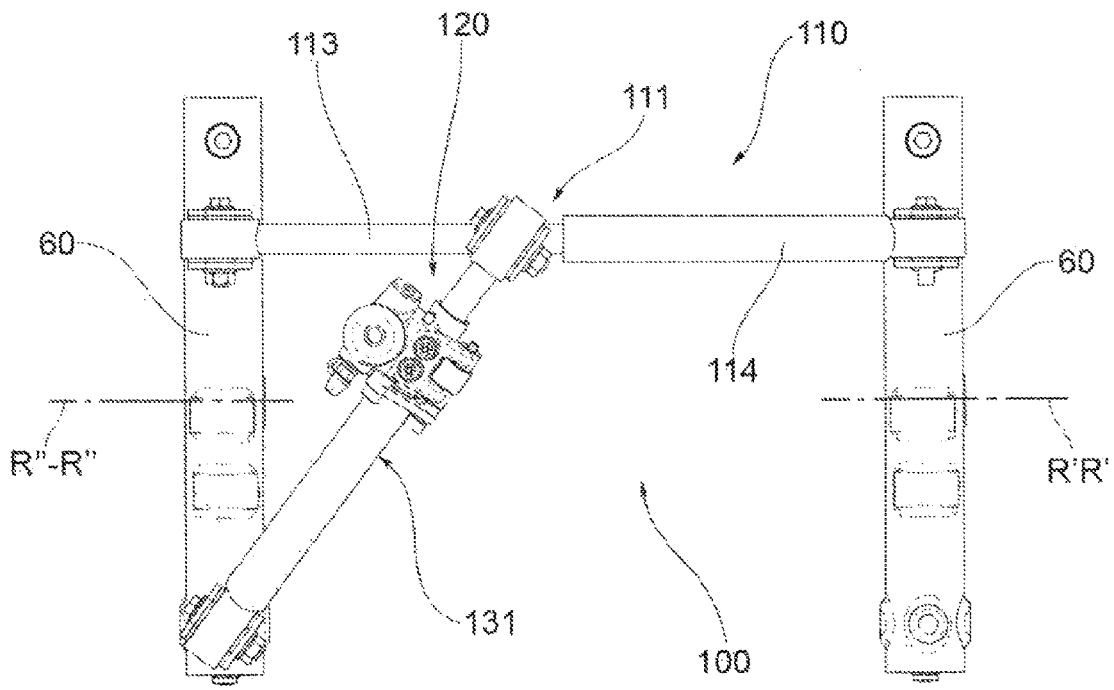
FIG. 7 shows a front orthogonal view of the layout of the roll block system adopted in the embodiment shown in FIG. 6.

According to the embodiment illustrated in FIGS. 6 and 7, the aforesaid releasable blocking means of the lying position of the aforesaid single rod may comprise a strut extensible in length 131 which is provided with blocking means of its length and connects diagonally said extensible rod 111 to one of the two axle journals 60.

More in detail, said strut 131 connects to the rod 111 and to the axle journal 60 at both its two ends via hinging means such that, when the strut is left free to extend in length, it is configured not to hinder the movement of the extensible rod with respect to the axle journal, while when it is blocked in length it is configured to prevent the rotation of the rod with respect to the axle journal in the common lying plane of the rod and strut.

Operatively, blocking the lying position of the rod with respect to the axle journal in the common lying plane of the rod and of the strut means blocking the lying position of said single rod 111 with respect to a vertical projection plane transverse to a centreline plane M-M of the motor vehicle. In this case too therefore what was said earlier about the resulting blocking of the lying plane of the two wheels applies.

In this specific case, the blocking of the rolling of the two wheels is carried out by acting on only one end of the rod, via a single strut. As mentioned earlier, the blocking of the rotation of only one end is sufficient to block the lying plane of the entire rod 111.

The aforementioned extensible strut 131 is positioned in such a way that, even when blocked, it is configured to leave the single extensible rod 111 free to extend in length.

Figure 9:
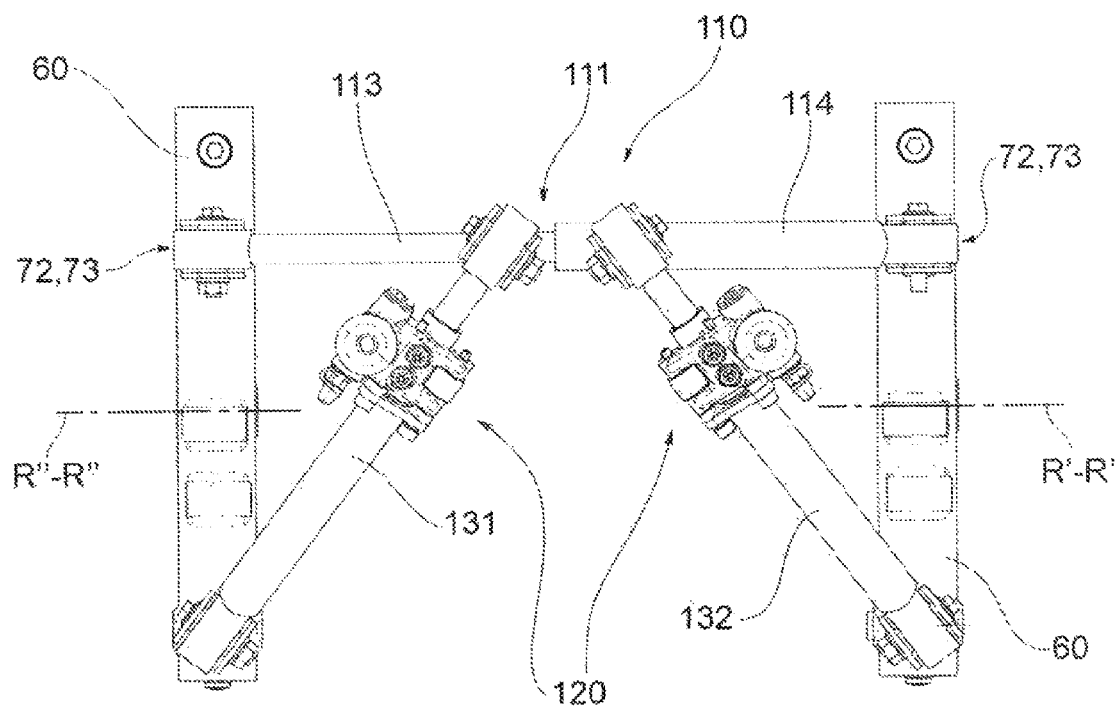
FIG. 9 shows a front orthogonal view of the layout of the roll block system adopted in the embodiment shown in FIG. 8.
Figure 8:
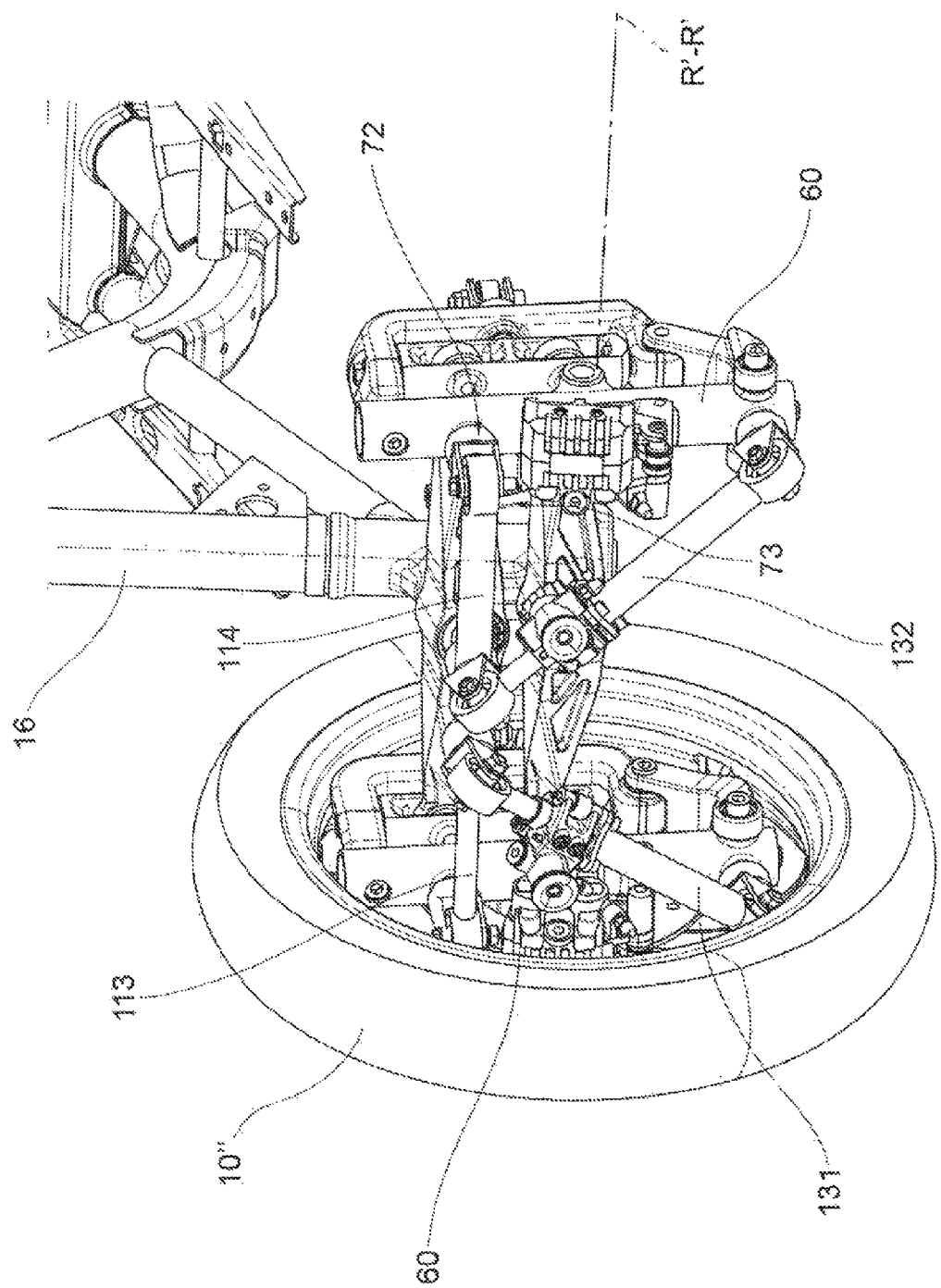
FIG. 8 shows a partial perspective view of the forecarriage of a motor vehicle equipped with a forecarriage with a roll block system according to a variant of the embodiment illustrated in FIG. 6.

According to the embodiment illustrated in FIGS. 8 and 9, the aforesaid releasable blocking means of the lying position of the aforesaid single rod may comprise two struts extensible in length 131 and 132, each of which is provided with blocking means of its length and diagonally connects the extensible rod to one of the two axle journals 60 on the two opposite ends.

More in detail, each strut 131 and 132 connects to the rod 111 and to the respective axle journal 60 at both its two ends via hinging means such that, when the strut 131, 132 is left free to extend in length, it is configured to not hinder the movement of the extensible rod 111 with respect to the axle journal 60, while when it is blocked in length it is configured to prevent the rotation of the rod with respect to the axle journal in the common lying plane of the rod and of the strut.

In this case, the blocking of the rolling of the two wheels is carried out by acting on both ends of the rod 111, by means of two struts 131, 132. As mentioned earlier, the blocking of the rotation at both ends is not strictly necessary, but is functional to ensure more secure blocking of the rod.

The two extensible struts 131 and 132 are positioned in such a way that, even when blocked, they are configured to leave said single extensible rod 111 free to extend in length. In particular, as shown in FIG. 8, the two struts 131, 132 work on different telescopic portions 113, 114 of the extensible rod 111.

Preferably, the hinging means of each strut 131 and 132 consist of pairs of cylindrical hinges having axes orthogonal to each other, one of the two hinges having the rotation axis orthogonal to the rolling plane of the two front wheels.

Figure 12:
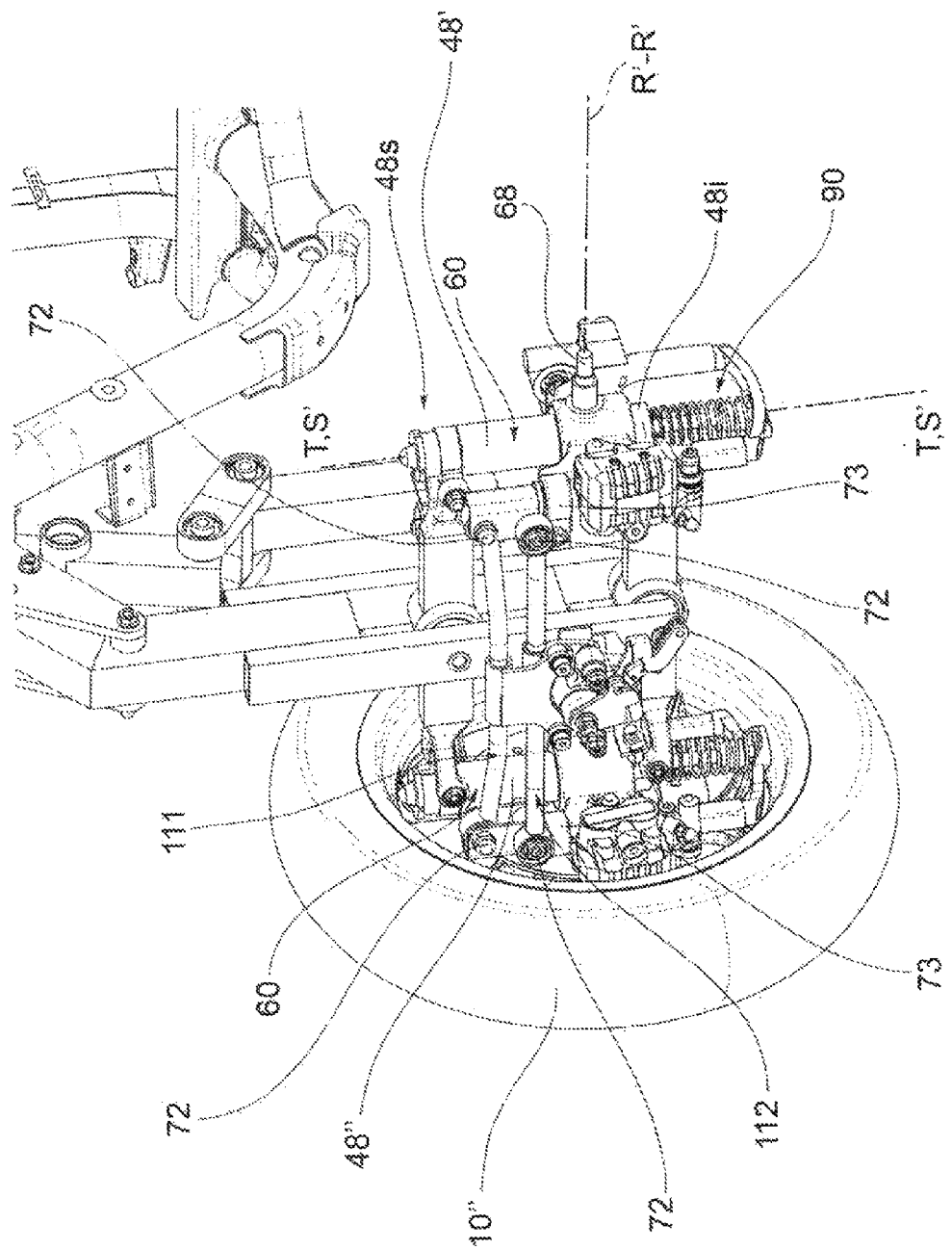
FIG. 12 shows a partial perspective view of a motor vehicle fitted with a forecarriage with a roll block system similar to that shown in FIGS. 10 and 11, but equipped with a different first kinematic mechanism.

According to a preferred second general embodiment, illustrated in FIGS. 10 and 11 and in a variant thereof in FIG. 12, the second kinematic mechanism 110 consists of a pair of rods extensible in length 111 and 112, each of which connects the two front wheels 10', 10" directly to each other at the respective axle journals 60 at its two ends by means of the aforesaid hinging means. Said two extensible rods 111 and 112 are preferably arranged parallel to one another and form with the two axle journals 60 an articulated quadrilateral, in which the axle journals 60 are the uprights and the two rods 111, 112 are the cross members.

The control device 120 of the configuration of the second kinematic mechanism 110 is composed of releasable blocking means of the configuration of the aforesaid articulated quadrilateral.

The aforesaid hinging means of both rods 111, 112 to the axle journals 60 may consist of a ball joint or a device kinematically similar to a ball joint.

Preferably, such device kinematically similar to a ball joint may consist of a pair of cylindrical hinges 72, 73 with axes orthogonal to each other.

As said previously, hinging means of the rods consisting of a pair of cylindrical hinges 72, 73 are adopted in the case in which said two extensible rods 111, 112 lie and move on a plane substantially parallel to a rolling plane of the two front wheels defined by said first kinematic mechanism 20. This occurs in particular in the case in which the first kinematic mechanism is composed of an articulated quadrilateral in which the uprights 48', 48" guide the movement of the axle journals 60 according to a rectilinear motion (see FIG. 12). In general, and in particular in cases in which the first kinematic mechanism does not allow a rectilinear spring suspension movement of the axle journals, it is preferable for the hinging means of said two extensible rods 111, 112, to consist of ball joints 71 (see for example FIGS. 10 and 11), so as to prevent jamming in the movements of said rods 111, 112.

In particular, each extensible rod 111, 112 may be formed of at least two portions 113, 114 telescopically associated to one another according to a main direction of longitudinal extension. Preferably, the two telescopic portions of each rod 111, 112 are associated to each other with a cylindrical coupling to allow a relative free rotation around said main direction of longitudinal extension.

Operatively, the aforesaid releasable blocking means of the configuration of said articulated quadrilateral are suitable to block the relative position between the two extensible rods 111, 112 of said pair in a releasable manner.

According to an embodiment not illustrated in the appended drawings, the two extensible rods 111 and 112 are arranged diagonally to each other in an X arrangement.

According to an embodiment not illustrated in the appended figures, the aforesaid releasable blocking means of the configuration of said articulated quadrilateral consist of at least one strut extensible in length, which has blocking means of its length and connects said two extensible rods 111, 112, diagonally to each other.

More in detail, said strut is connected to the two rods at its two ends via hinging means such that, when the strut is left free to extend in length, it is configured to not hinder the relative movement between the two extensible rods, while when it is blocked in length it is configured to prevent the two rods from moving in relation to one changing the configuration of the articulated quadrilateral.

Said extensible strut is positioned so that, even when blocked, it is configured to leave the two rods free to extend in length.

According to the embodiment illustrated in FIGS. 10 and 11, the aforesaid releasable blocking means of the configuration of said articulated quadrilateral may consist of a sector of a disc brake, comprising a caliper 123 attached to a first extensible rod 111 and a sector of disc 124, fixed to the other extensible rod 112, which the caliper 123 acts on, operable to engage or disengage the sector of disc 124. When the caliper 123 engages the sector of disc 124 in blocking, the two extensible rods are blocked one to the other, and consequently it is blocked also the configuration of the articulated quadrilateral. This situation corresponds to the second kinematic mechanism 110 in the blocked configuration.

Advantageously, each of the two extensible rods 111, 112 is made of at least two portions 113, 114 telescopically associated to each other. The caliper 123 and the sector of disc 124 are fixed to the same portions 114 of the two extensible rods in such a way that even in the blocked configuration the two rods 111, 112 are free to extend in length.

Alternatively to the disc sector brake, the aforesaid releasable blocking means of the configuration of said articulated quadrilateral may consist of a ratchet system. More in detail, said ratchet system comprises a sprocket made on a first extensible rod and a movable pawl, pivoted on the other telescopic rod, operable to engage or disengage the sprocket so as to block the relative position of the two rods. Said ratchet system is fixed to the two extensible rods in such a way that even in the blocked configuration the two rods 111, 112 are free to extend in length.

Unlike the disc sector caliper, the ratchet system does not allow a continuous blocking of the two rods in any configuration of the quadrilateral, but only a blocking at discrete values. The vehicle may thus be blocked only at predefined roll angles.

As already mentioned above, the forecarriage 8 according to the invention is provided with a steering device 36, 86 suitable to command the rotation of the axle journals 60 around respective steering axes S'-S', S"-S" of each front wheel 10', 10". The steering device may act directly on the axle journals 60 and be subjected to the action of the suspensions (as shown in FIGS. 12 and 13) or act indirectly on the axle journals without being subjected to the action of the suspensions (as shown for example in FIGS. 1-3 or in FIGS. 17-19).

According to the embodiment illustrated in FIG. 13, in the case in which the steering device acts directly on the axle journals 60, the steering device itself may be kinematically integrated in the first kinematic mechanism 110 in order to selectively block the rolling movements of the two front wheels.

More in detail, the steering device kinematically connects the axle journals 60 to each other so as to command the rotation of the axle journals 60 around respective steering axes S'-S', S"-S" of each front wheel 10', 10". Such a steering device comprises a horizontal steering bar 36 which directly connects the two axle journals 60 to each other at its two ends by means of two cylindrical hinges with orthogonal axes, wherein the axis of rotation of a first hinge of said pair is orthogonal to a rolling plane of the two front wheels 10', 10".

Said steering bar 36 is in turn supported by a steering column 86 at an intermediate point between its two ends so as to oscillate around a rotation axis substantially orthogonal to a rolling plane of the two front wheels 10', 10" defined by said first kinematic mechanism 20.

Preferably, the first kinematic mechanism 20 consists of an articulated quadrilateral with rectilinear guiding of the axle journals.

The second kinematic mechanism 110 consists of a single extensible rod 111 which connects the two axle journals to each other parallel to said steering bar 36, but at a different vertical height, so as to form with said steering bar an articulated quadrilateral, in which the two cross members are defined by the steering bar and by said single extensible rod and the two uprights are defined by axle journals 60.

The releasable means for blocking the lying position of said single rod 111 with respect to a vertical projection plane transverse to a centreline plane M-M of the motor vehicle consist of a blocking device of the configuration of said articulated quadrilateral.

In particular, as shown in FIG. 13, the releasable blocking means consists of a ratchet system. More in detail, said ratchet system comprises a sprocket 134 made on the steering bar and a movable pawl 135, which is associated to the extensible rod 111, for example via a support bracket 136 on the other telescopic rod, and is operable to engage or disengage the sprocket 134 so as to block the relative position of the two rods. Said ratchet system is associated to the extensible rod in such a way that even in the blocked configuration it is free to extend in length.

Alternatively, the ratchet system may be replaced by a disc sector brake.

Figure 17:
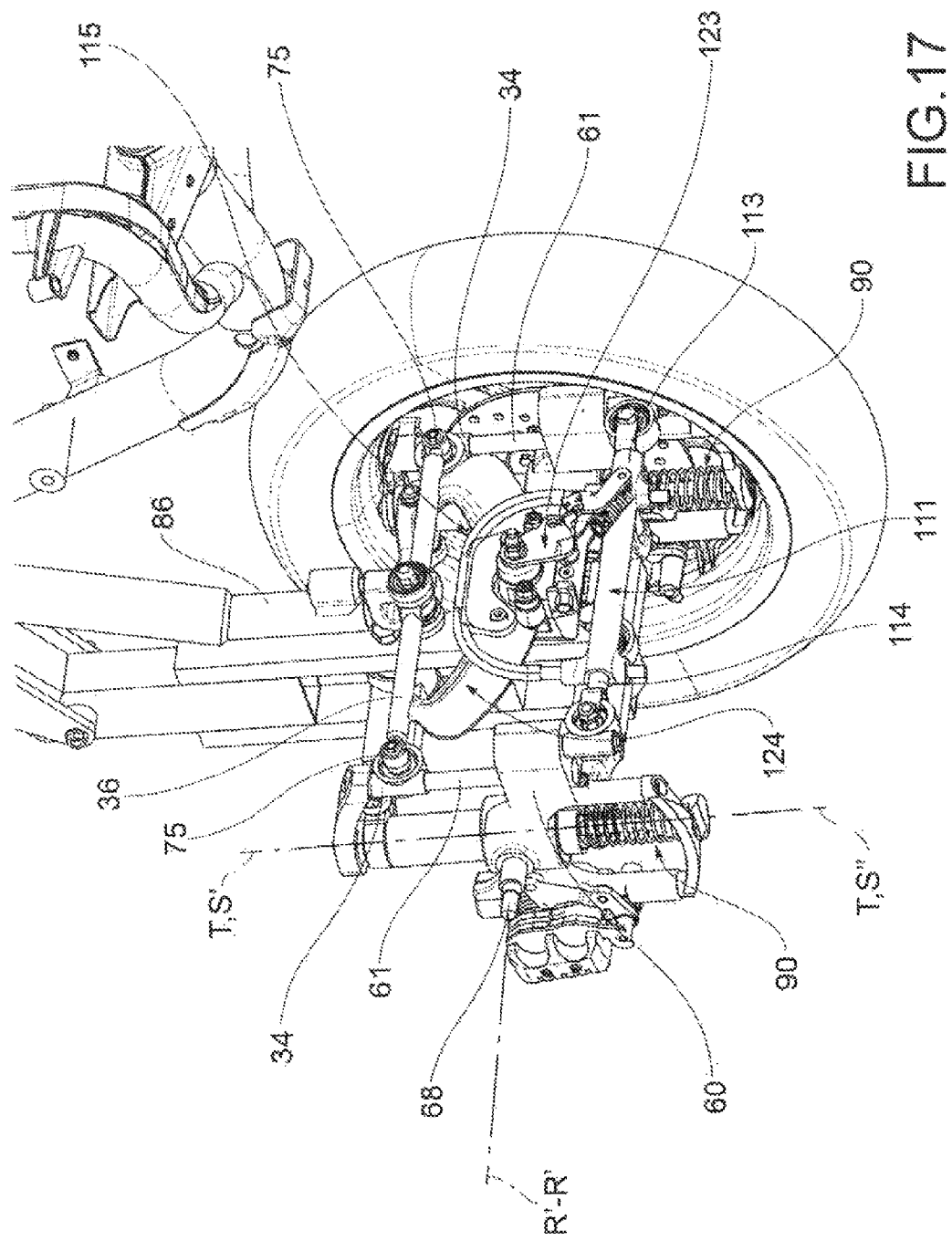
FIG. 17 shows a rear perspective view of a detail of a forecarriage of a motor vehicle with a roll block system according to a fifth embodiment of the invention with a non-sprung steering bar.

According to the embodiment illustrated in FIG. 17, the steering device indirectly acts on the axle journals without being subject to the action of the suspensions.

In this case too, the steering device 36 may be kinematically integrated in the first kinematic mechanism 110 so as to selectively block the rolling movements of the two front wheels.

More in detail, the steering bar 36 is slidingly connected at both of its ends through a bushing 34 to two support columns 61, which have axes parallel to the steering S-S axes and suspension T-T axes and are in turn each integral with an axle journal 60. The steering bar 36 forces the axle journals to rotate around respective steering axes S'-S', S"-S" by acting on said two columns 61. This type of connection enables the axle journals 60 to move with respect to the steering bar 36, translating along the longitudinal axes of the two columns 61, and in turn allows the steering bar 36 to be independent of the action of the suspensions.

The steering bar 36 is connected to each bushing 34 by means of a cylindrical hinge 75 with rotation axis orthogonal to a rolling plane of the two front wheels 10', 10". The steering bar 36 is in turn supported by a steering column 86 at an intermediate point between its two ends so as to oscillate around a rotation axis substantially orthogonal to a rolling plane of the two front wheels 10', 10" defined by the first kinematic mechanism 20.

The first kinematic mechanism 20 consists of an articulated quadrilateral with rectilinear guiding of the axle journals.

The second kinematic mechanism 110 consists of a single extensible rod 111 which connects the two axle journals to each other parallel to said steering bar 36, but at a different vertical height, so as to form with said steering bar an articulated quadrilateral, in which the two cross members are defined by the steering bar and by said single extensible rod and the two uprights are defined by axle journals 60.

The releasable means for blocking the lying position of said single rod 111 with respect to a vertical projection plane transverse to a centreline plane (M-M) of the motor vehicle consist of a blocking device of the configuration of said articulated quadrilateral.

In particular, as shown in FIG. 17, the releasable blocking means consists of a disc sector brake, comprising a caliper 123 associated to said single extensible rod 111 and to a sector of disc 124, fixed on the steering bar 36. The caliper 123 is not integral with the extensible rod 111, but is associated to it by means of a bracket 115 which is connected to a portion of the extensible rod with freedom to translate parallel to the steering axes S-S, remaining on the common lying plane of the extensible rod 111 and of the steering bar 36. The caliper 123 acts on the sector of disc 124, operable to engage or disengage the sector of disc 124. When the caliper 123 engages the sector of disc 124 in blocking, the steering bar 36 and the extensible rod 111 are interconnected one to the other, but with freedom to translate parallel to the steering axes S-S. With the caliper actuated, the configuration of the articulated quadrilateral is therefore blocked. The steering bar continues to be independent of the suspensions, and pitching is therefore not inhibited. This situation corresponds to the second kinematic mechanism 110 in the blocked configuration.

Advantageously, the extensible rod 111 is made of at least two portions 112, 113 telescopically associated to each other. The caliper 123 via the bracket 115 is associated to one of the two portions in such a way that even in the blocked configuration the rod 111 is free to extend in length.

Figure 18:
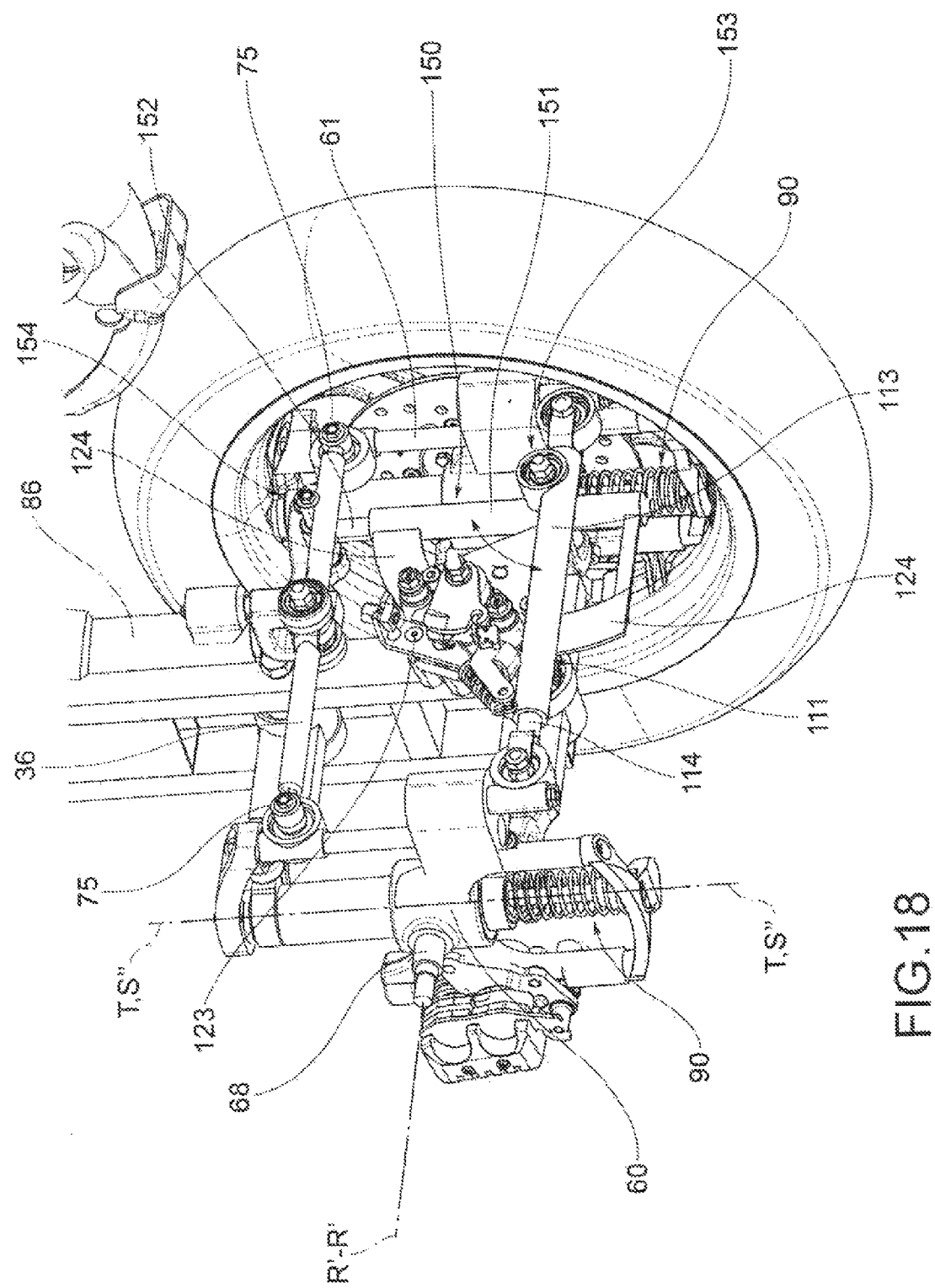
FIG. 18 shows a partial perspective view of the forecarriage of a motor vehicle equipped with a forecarriage with a roll block system according to a variant of said fifth embodiment of the invention.

FIG. 18 shows a variant of the embodiment illustrated in FIG. 17. The difference lies in the blocking device of the configuration of the articulated quadrilateral, the cross-members of which are defined by the steering bar 36 and the extensible rod 111.

More in detail, said blocking device comprises a connection bar 150, consisting of two telescopic portions 151 and 152. A first telescopic portion 151 of the bar 150 is associated to a portion 113 of the extensible rod 111 by means of a cylindrical hinge 153; the second telescopic portion 152 of the bar 150 is associated to the steering bar 36 via a ball joint 154. Thanks to the cylindrical hinge 153 the connection bar 150 can rotate with respect to the extensible rod 111, so as to vary the angle γ existing between the rod 111 and bar 150. By blocking the angle γ the configuration of the quadrilateral is blocked. Thanks to the degree of freedom given by the telescopic connection bar 150 the steering bar continues to be independent of the suspensions, and thus pitching is not inhibited.

In the variant illustrated in FIG. 18, the releasable blocking means of the quadrilateral configuration (i.e. the angle α) consist of a disc sector brake, comprising a caliper 123 and a sector of disc 124. The caliper 123 is integral with said portion 113 of the extensible rod 111 to which the first telescopic portion 151 of the connection bar 150 is associated. The sector of disc 124 is instead attached to the first telescopic portion 151 of the bar 150. With the caliper actuated, the sector of disc 124 can no longer rotate with respect to the caliper 123 and the angle α is thus blocked.

Figure 19:
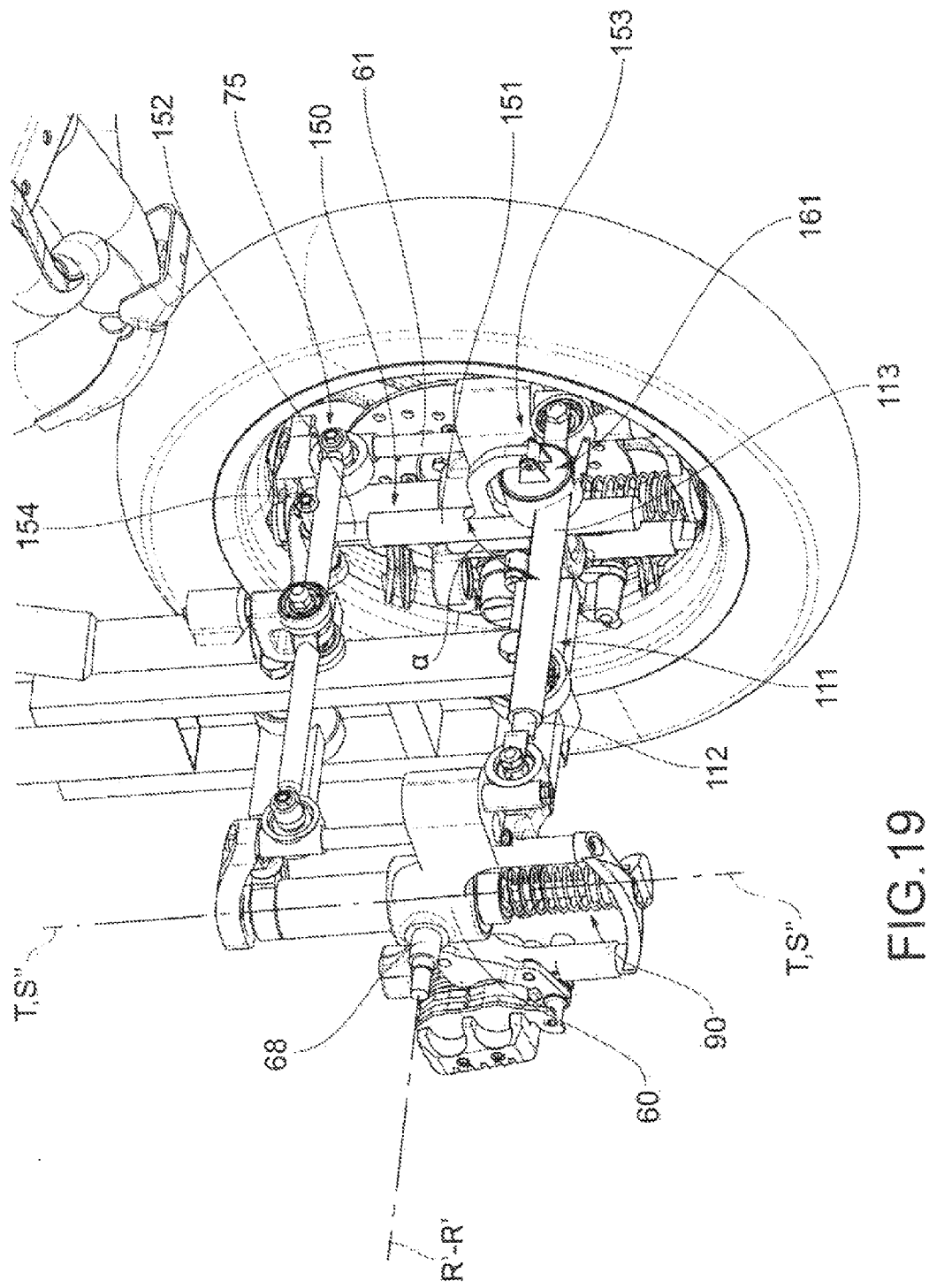
FIG. 19 shows a partial perspective view of the forecarriage of a motor vehicle equipped with a forecarriage with a roll block system according to a further variant of said fifth embodiment of the invention.

FIG. 19 shows a further variant of the embodiment illustrated in FIG. 17. Such further variant differs from the variant in FIG. 20 in that the releasable blocking means of the quadrilateral configuration (i.e. the angle α) comprise a brake band 161 to block the rotation in the cylindrical hinge 153, rather than a disc sector brake.

Figure 20:
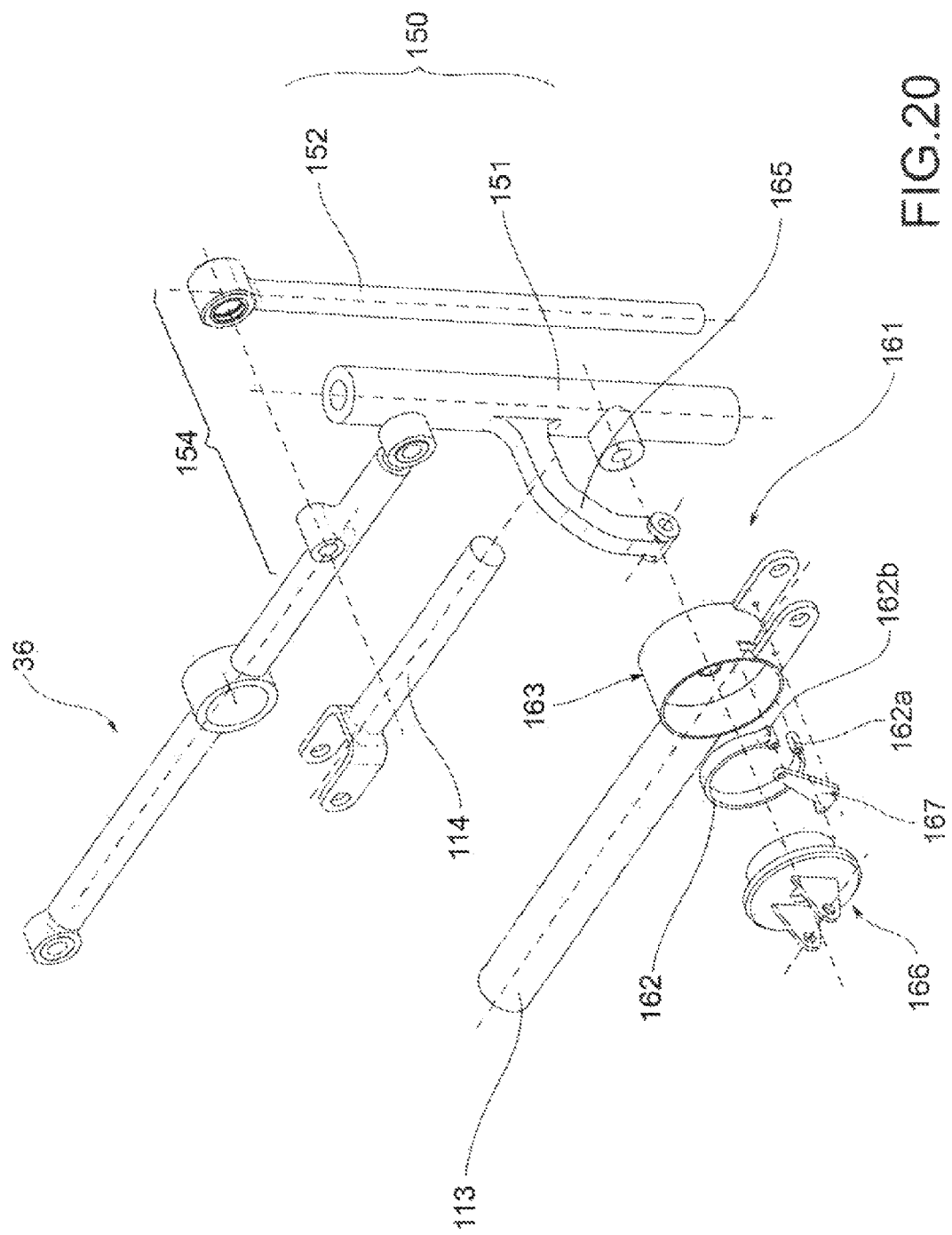
FIG. 20 shows an exploded perspective view only of the second kinematic mechanism shown in FIG. 19.

FIG. 20 shows a detail in exploded view of the second kinematic mechanism with brake band shown in FIG. 19.

More in detail, the brake band 161 is placed at the cylindrical hinge 153. The brake 151 comprises: a support body 163 integral with the portion 113 of the extensible rod 111 and a drum 166 which is rotationally associated to the support body 163 to rotate around the axis defined by the hinge 153 and is integrally associated to the first telescopic portion 151 of the connection bar 150 via a support arm 165 which extends cantilevered from said bar. The drum 166 is partially inserted inside the support body 163 and forms with it an annular interspace inside which a band 162 is housed. The two ends 162a and 162b of the band 162 are fixed to an actuation lever 167 of the brake band in different positions. By actuating the lever 167, the band 162 is tightened around the drum 166 and prevents its rotation around the hinge axis. This way the rotation of the connection bar 150 around the extensible rod 111 is prevented and the angle γ is blocked. When the lever 167 is not operated, the band 162 is not tight around the drum and the connection bar 150 is free to rotate around the hinge axis.

The present invention relates to a motor vehicle 4 having at least one drive wheel on the rear and a forecarriage 8 according to the present invention, and in particular as described above.

In the case in which the motor vehicle is a quadricycle, the rear drive wheels 14 at the rear 12 are connected to each other and to a rear frame 13 by means of a first kinematic mechanism 20 as described above in relation to the front wheels 10.

The technical solutions illustrated in FIGS. 18 and 19 refer to the case of a first kinematic mechanism 20 consisting of an articulated quadrilateral with rectilinear guiding of the axle journals. Such technical solutions are however particularly suitable to be applied in the case in which the articulated quadrilateral is made in such a way that each of the uprights 48 guides and supports the axle journal 60 of the respective front wheel 10', 10" externally to itself by means of a roto-translational type kinematic connection system. In this case, in fact, the extensible rod 111—following the axle journals—does not always remain in the same lying plane as the steering bar. The disconnection between the steering bar and extensible rod provided by the ball joint, which connects the connection bar to the steering bar, avoids the kinematic problems associated with such variations of the lying plane.

The present invention relates to a method for blocking the rolling movements of a rolling motor vehicle with three or four wheels, having a forecarriage according to the present invention, and in particular as described above. Said method comprises:

an activation step of the second kinematic mechanism 110, in which the latter is brought into the aforesaid blocked configuration to block the rolling movements; and a deactivation step of the second kinematic mechanism 110, in which the latter is brought into the aforesaid released configuration to free the rolling movements; and The present invention relates to a method of blocking the rolling movements of a rolling motor vehicle with three or four wheels, having:

a forecarriage frame 16, at least one pair of front wheels 10', 10" kinematically connected to each other and the forecarriage frame 16 by means of a first kinematic mechanism 20 which enables the same to roll in a synchronous and specular manner, each wheel 10', 10" being connected to said first kinematic mechanism 20 by means of a respective axle journal 60, the latter being mechanically connected to a rotation pin 68 of the wheel in order to support it rotatably around an axis of rotation R'-R', R"-R", suspension means 90 which guarantee each axle journal 60 at least one spring suspension movement with respect to said first kinematic mechanism 20, Such method comprises the operating step a) of providing a second kinematic mechanism 110 which directly connects the two front wheels 10', 10" to one another at the respective axle journals 60 by means of hinging means and is free to extend in length parallel to a joining direction of the two axle journals.

The aforesaid second kinematic mechanism 110 is susceptible to take on at least two different configurations:

a free configuration, wherein the second kinematic mechanism 110 passively follows the movements of said two wheels 10', 10" with respect to each other and with respect to the frame 16 without interfering with them; and a blocked configuration, wherein the second kinematic mechanism 110 blocks the angle α formed by a lying plane of at least one wheel with respect to the ground, thus preventing rolling movements between the two wheels and at the same time freeing the pitching and steering movements. The aforesaid lying plane of the wheel is perpendicular to the axis of rotation R'-R', R"-R" of the wheel.

The method further comprises the following operating steps:

b) activating said second kinematic mechanism 110, making it assume said blocked configuration to block the rolling movements; and c) deactivating said second kinematic mechanism 110, making it assume said free configuration to allow the rolling movements.

The invention permits numerous advantages to be achieved, in part already described.

The forecarriage of the rolling motor vehicle according to the invention is equipped with a roll block system which, when activated, does not inhibit either the pitching (symmetrical spring suspension movements), or steering of the motor vehicle. In fact, the roll block system according to the invention, when not actuated, does not introduce any kinematic uncorrection to the movements of the wheels due to steering, rolling and spring suspension movements. When actuated, the block system permits blocking of the rolling movements, without interfering with the pitching (symmetrical spring suspension) and steering movements.

Moreover, the forecarriage of a rolling motor vehicle according to the invention is equipped with a roll block system which is constructively simple and inexpensive to produce and to fit on said motor vehicle. It may in fact consist, in particular, of one or two telescopic rods extensible in length, placed in connection between the two axle journals of the front wheels. Blocking of the rolling is carried out simply by blocking the lying plane of said one or two telescopic rods.

The roll block system according to the invention is also independent of the kinematic mechanism which enables the wheels to roll synchronously and in a specular manner.

The proposed system, in addition to being cheaper, is also conceptually better than traditional solutions because with the rolling blocked the pitching (understood as a symmetrical suspension movements) is not inhibited, to the benefit of safety and reduction of the loads on the structure.

The invention thus conceived thereby achieves the intended objectives.

Obviously, its practical embodiments may assume forms and configurations different from those described while remaining within the sphere of protection of the invention.

Moreover, all the details may be replaced by technically equivalent elements and the dimensions, forms and materials used may be any as needed.

The invention claimed is:

1. A forecarriage of a rolling motor vehicle with three or four wheels, comprising:

a forecarriage frame, at least one pair of front wheels kinematically connected to each other and to the forecarriage frame by means of a first kinematic mechanism which enables the front wheels to roll in a synchronous and specular manner, each wheel being connected to said first kinematic mechanism by means of a respective axle journal, said axle journal being mechanically connected to a rotation pin of respective wheel in order to rotatably support said wheel around an axis of rotation, a roll block system, suspension means which guarantee each axle journal at least one spring suspension movement with respect to said first kinematic mechanism, wherein said roll block system comprises a second kinematic mechanism which directly connects said front wheels to one another at the respective axle journals by means of hinging means and is free to extend in length parallel to a joining direction of the two axle journals, said second kinematic mechanism being susceptible to take on at least two different configurations:
- a free configuration, wherein said second kinematic mechanism is configured to passively follow the movements of said two front wheels with respect to each other and with respect to the frame without interfering with them; and
- a blocked configuration, wherein said second kinematic mechanism is configured to block the angle formed by a lying plane of at least one wheel with respect to the ground, said lying plane being orthogonal to the axis of rotation of said wheel;

said roll block system comprising a control device of the configuration of the second kinematic mechanism which is suitable to act on the second kinematic mechanism to take it from said free configuration to said blocked configuration and vice versa.

2. The forecarriage according to claim 1, wherein said second kinematic mechanism consists of one or more rods extensible in length each of which connects the two front wheels directly to each other at the respective axle journals at its two ends by means of said hinging means, said control device of the second kinematic mechanism being operatively connected to each of said one or more extensible rods to reversibly block the lying position of the latter with respect to a vertical projection plane, which is transverse to a centreline plane of the motor vehicle, in said free configuration said one or more extensible rods being free to change its lying position with respect to said projection plane, in said blocked configuration said one or more extensible rods being prevented from changing its lying position with respect to said projection plane.

3. The forecarriage according to claim 2, wherein said hinging means, with which each of said one or more extensible rods is connected at both its ends to the axle journals, consist of a ball joint or of a device kinematically equivalent to a ball joint.

4. The forecarriage according to claim 3, wherein said device kinematically equivalent to a ball joint consists of a pair of cylindrical hinges having axes orthogonal to each other.

5. The forecarriage according to claim 2, wherein each of said one or more rods extensible in length is made of at least two portions telescopically associated to each other in a main direction of longitudinal extension.

6. The forecarriage according to claim 2, wherein each of said one or more rods extensible in length connects the two axle journals one to each other at the same height from the ground.

7. The forecarriage according to claim 2, wherein each of said one or more rods extensible in length connects the two axle journals one to each other in a position as close as possible to the corresponding steering axles at the two front wheels.

8. The forecarriage according to claim 1, wherein said second kinematic mechanism consists of a single rod extensible in length which directly connects the two front wheels to each other at the respective axle journals at the ends thereof.

9. The forecarriage according to claim 8, wherein at least one of the two ends of said single extensible rod is connected to the respective axle journal by hinging means consisting of a pair of cylindrical hinges having axes orthogonal to each other, the axis of rotation of a first hinge of said pair being orthogonal to a rolling plane of the two front wheels so that the extensible rod can move parallel to said rolling plane when the second kinematic mechanism is in the free configuration, said releasable blocking means of the lying position of said rod with respect to the vertical projection plane, which is transverse to a centreline plane of the motor vehicle being suitable to block the rotation of said rod around said first hinge so as to bring said second kinematic mechanism into said blocked configuration.

10. The forecarriage according to claim 9, where said releasable means comprise a band brake or a drum brake placed at the end of the rod which is connected to the respective axle journal by means of said pair of cylindrical hinges having axes orthogonal to each other, said band brake or drum brake being associated to the first cylindrical hinge to block the rotation thereof in a releasable manner.

11. The forecarriage according to claim 9, wherein said single extensible rod is connected to the axle journals at both its ends by means of the pair of cylindrical hinges having axes orthogonal to each other, the rotation axis of the first hinge of said pair being orthogonal to the rolling plane of the two front wheels, said releasable means comprising a band brake or a drum brake positioned at each end of said single extensible rod, each band brake or drum brake being associated to the respective first cylindrical hinge to block the rotation thereof in a releasable manner.

12. The forecarriage according to claim 8, wherein said releasable means to block the lying position of said rod with respect to a vertical projection plane, which is transverse to a centreline plane of the motor vehicle comprise a strut extensible in length which is provided with blocking means of its length and connects diagonally said extensible rod to one of the two axle journals, said strut connecting to the rod and to the axle journal at both its ends by means of hinging means such that, when the strut is left free to extend in length, it is configured not to hinder the movement of the extensible rod relative to the axle journal, while when it is blocked in length it is configured to prevent the rotation of the rod relative to the axle journal on the common lying plane of the rod and strut, said extensible strut being positioned so that, even when blocked, it is configured to leave said single extensible rod free to extend in length.

13. The forecarriage according to claim 8, wherein said releasable means to block the lying position of said rod with respect to a vertical projection plane, which is transverse to a centreline plane of the motor vehicle comprise two struts extensible in length, each of which is provided with blocking means of its length and connects diagonally the extensible rod to one of the two axle journals, each strut connecting to the rod and to the corresponding axle journal at both its ends by means of hinging means such that, when the strut is left free to extend in length, it is configured not to hinder the movement of the extensible rod relative to the axle journal, while when it is blocked in length it is configured to prevent the rotation of the rod relative to the axle journal on the common lying plane of the rod and strut, said two extensible struts being positioned so that, even when blocked, they are configured to leave said single extensible rod free to extend in length.

14. The forecarriage according to claim 12, wherein said hinging means consist of pairs of cylindrical hinges having axes orthogonal to each other, one of the two hinges having the rotation axis orthogonal to the rolling plane of the two front wheels.

15. The forecarriage according to claim 1, where said second kinematic mechanism comprises a pair of rods extensible in length, each of which directly connects the two front wheels at the respective axle journals to its two ends by means of said hinging means, said two rods being placed parallel to each other and forming with the axle journals an articulated quadrilateral, in which the axle journals are the uprights and the two rods are the cross members, the control device of the configuration of the second kinematic mechanism consisting of releasable blocking means of the configuration of said articulated quadrilateral.

16. The forecarriage according to claim 15, wherein said hinging means consist of a ball joint or a device kinematically equivalent to a ball joint.

17. The forecarriage according to claim 15, wherein each extensible rod is made of at least two portions telescopically associated to each other in a main direction of longitudinal extension.

18. The forecarriage according to claim 15, wherein said releasable blocking means of the configuration of said articulated quadrilateral are suitable to block the relative position between the two extensible rods of said pair in a releasable manner.

19. The forecarriage according to claim 18, wherein said releasable blocking means of the configuration of said articulated quadrilateral consist of at least one strut extensible in length, which has blocking means of its length and connects said two extensible rods diagonally to each other, said strut connecting to the two rods at its two ends by means of hinging means such that, when the strut is left free to extend in length, it is configured not to hinder the relative movement between the two extensible rods, while when it is blocked in length it is configured to prevent the two rods from moving relative to each other by modifying the configuration of the articulated quadrilateral, said extensible strut being positioned so that, even when blocked, it is configured to leave the two rods free to extend in length.

20. The forecarriage according to claim 18, wherein said releasable blocking means of the configuration of said articulated quadrilateral consist of a caliper acting on a sector of a brake disc, said caliper and said sector being integral respectively to an extensible rod and to the other extensible rod, or consisting of a ratchet acting on a sprocket, said ratchet and said sprocket being integral respectively with an extensible rod and with the other extensible rod.

21. The forecarriage according to claim 9, comprising a steering device which kinematically connects the axle journals to each other so as to command the rotation of the axle journals around respective steering axes of each front wheel, said steering device comprising a horizontal steering bar which connects the two axle journals to each other at its two ends by means of two cylindrical hinges having orthogonal axes, said steering bar being in turn supported by a steering column at an intermediate point between its two ends so as to oscillate around a rotation axis substantially orthogonal to a rolling plane of the two front wheels defined by said first kinematic mechanism, wherein the single extensible rod of said second kinematic mechanism connects the two axle journals to each other parallel to said steering bar, but at a different vertical height, to form with said steering bar an articulated quadrilateral, in which the two cross members are defined by the steering bar and by said extensible rod and the two uprights are defined by the axle journals, and wherein said releasable means for blocking the lying position of said single extensible rod with respect to the vertical projection plane transverse to the centreline plane of the motor vehicle consist of a blocking device of the configuration of said quadrilateral.

22. The forecarriage according to claim 21, wherein said steering bar is connected directly to the axle journals and is subjected to the action of the suspensions.

23. The forecarriage according to claim 21, in which said steering bar is connected indirectly to the axle journals and is not subjected to the action of the suspensions.

24. The forecarriage according to claim 21, wherein said releasable means to block the lying position of said rod with respect to a vertical projection plane, which is transverse to a centreline plane of the motor vehicle consist of a disc brake, a band brake or a ratchet system.

25. The forecarriage according to claim 1, wherein the control device of the configuration of the second kinematic mechanism is suitable to act on the second kinematic mechanism to bring it from the free configuration to the blocked configuration and vice versa by following a predefined control logic set by an electronic automatic actuation system or, alternatively or in parallel, following manual commands set by the user of the motor vehicle via a manual actuation system.

26. The forecarriage according to claim 25, comprising an electronic control system, wherein the electronic control system is configured to filter the manual commands set by the user according to a main operating logic of the motor vehicle aimed at ensuring the safety thereof.

27. A motor vehicle having a drive wheel at the rear and a forecarriage according to claim 1.

28. A method of blocking the rolling movements of a motor vehicle with three or four wheels, having a forecarriage according to claim 1, said method comprising:
an activation step of said second kinematic mechanism, in which the latter is brought into said blocked configuration to block the rolling movements; and
a deactivation step of said second kinematic mechanism, in which the latter is brought into said free configuration to allow the rolling movements.

29. A method of blocking the rolling movements of a rolling motor vehicle with three or four wheels, having:
a forecarriage frame,
at least one pair of front wheels kinematically connected to each other and the forecarriage frame by means of a first kinematic mechanism which enables the front wheels to roll in a synchronous and specular manner, each wheel being connected to said first kinematic mechanism by means of a respective axle journal, said axle journal being mechanically connected to a rotation pin of the wheel in order to support it rotatably around an axis of rotation,
suspension means which guarantee each axle journal at least one spring suspension movement with respect to said first kinematic mechanism,
said method comprising the following operating steps:
a) providing a second kinematic mechanism which directly connects the two front wheels to each other at the respective axle journals by means of hinging means and is free to extend in length parallel to a joining direction between the two axle journals, said second kinematic mechanism being susceptible to assume at least two different configurations:
a free configuration, wherein said second kinematic mechanism passively follows the movements of said two wheels with respect to each other and with respect to the frame without interfering with them; and
a blocked configuration, wherein said second kinematic mechanism blocks the angle formed by a lying plane of at least one wheel with respect to the ground, said lying plane being orthogonal to the axis of rotation of said wheel;
b) activating said second kinematic mechanism, making it assume said blocked configuration to block the rolling movements; and c) deactivating said second kinematic mechanism, making it assume said free configuration to allow the rolling movements.

30. The forecarriage according to claim 4, wherein one of the two hinges of said pair having its hinge axis orthogonal to the rolling plane of the two front wheels.

31. The forecarriage according to claim 5, wherein the two portions of the rod being associated to each other with a cylindrical coupling to allow a free relative rotation around said main direction of longitudinal extension.

32. The forecarriage accordingly to claim 8, wherein said single extensible rod is made of at least two portions telescopically associated to each other in a main direction of longitudinal extension.

33. The forecarriage of claim 32, wherein the two portions of the rod are associated to each other with a cylindrical coupling to allow a free relative rotation around said main direction of longitudinal extension.

34. The forecarriage of claim 33, wherein said single extensible rod is fixed to the axle journals at its two ends by means of a ball joint or a device kinematically equivalent to a ball joints, and wherein said configuration control device of the second kinematic mechanism comprises releasable means to block the lying position of said rod with respect to a vertical projection plane, which is transverse to a centreline plane of the motor vehicle.

35. The forecarriage according to claim 16, wherein said device kinematically equivalent to a ball joint consists of a pair of cylindrical hinges having axes orthogonal to each other.

36. The forecarriage according to claim 17, wherein the two portions of the rod are associated to each other with a cylindrical coupling to allow a free relative rotation around said main direction of longitudinal extension.

* * * * *